(12) United States Patent
Mock et al.

(10) Patent No.: US 12,723,640 B2
(45) Date of Patent: Sep. 1, 2026

(54) MODULAR TRANSMISSION FOR AN ELECTRIC DRIVE SYSTEM

(71) Applicant: Allison Transmission, Inc., Indianapolis, IN (US)

(72) Inventors: Isaac Mock, Martinsville, IN (US); Connor Claussen, Brownsburg, IN (US); Jeremy Turner, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/415,752

(22) Filed: Jan. 18, 2024

(65) Prior Publication Data

US 2025/0237292 A1 Jul. 24, 2025

(51) Int. Cl.
*F16H 3/66* (2006.01)
*F16H 57/02* (2012.01)

(52) U.S. Cl.
CPC ... *F16H 3/663* (2013.01); *F16H 2057/02013* (2013.01); *F16H 2057/02034* (2013.01)

(58) Field of Classification Search
CPC ................................ F16H 57/033–2057/0335; F16H 2057/02013; F16H 2200/2033–2061; F16H 2200/2064; F16H 2200/2094; F16H 2200/2007–2017; F16H 3/54–3/66; F16H 2200/0034–0078
See application file for complete search history.

(56) References Cited

U.S. PATENT DOCUMENTS 2,180,671 A 11/1939 Gaston
2,806,388 A 9/1957 Simpson
2,856,795 A 10/1958 Simpson
2,914,967 A 12/1959 Simpson
2,939,341 A 6/1960 Evemden
3,934,605 A * 1/1976 Legris .................... F16L 37/26 285/125.1

(Continued)

FOREIGN PATENT DOCUMENTS

CN 1400409 10/2014
CN 106696690 A 5/2017

(Continued)

*Primary Examiner* — Ernesto A Suarez
*Assistant Examiner* — Lillian T Nguyen
(74) *Attorney, Agent, or Firm* — Woodard Emhardt Henry Reeves & Wagner LLP

(57) ABSTRACT

A modular transmission for an electric drive system that includes multiple individual drive modules configured to each provide two forward and two reverse gear ratios. The individual drive modules optionally include separate and distinct housings at least partially enclosing a planetary gearset. A shifting assembly is optionally included for each drive module that is operable to selectively couple the ring gear either to the carrier, the sun gear, or to ground to achieve two different gear ratios. Multiple drive modules may be coupled together using corresponding mount points of the housings thus allowing a transmission and drive system to be formulated quickly, or to be modified or repaired, without undue time and expense. An electric motor may be arranged upstream, or downstream of the multiple individual drive modules, or positioned between modules.

21 Claims, 24 Drawing Sheets

(56) References Cited

U.S. PATENT DOCUMENTS

| | | | | |
|---|---|---|---|---|
| 3,946,623 | A * | 3/1976 | Murakami | F16H 3/666 475/276 |
| 4,019,406 | A * | 4/1977 | Herr | F16H 57/033 475/66 |
| 4,046,031 | A | 9/1977 | Ott | |
| 4,483,215 | A | 11/1984 | Ishimaru et al. | |
| 4,627,310 | A * | 12/1986 | Coburn | B25B 17/02 81/58.3 |
| 4,653,348 | A | 3/1987 | Hiraiwa | |
| 4,722,242 | A | 2/1988 | Miura | |
| 5,194,055 | A | 3/1993 | Oshidari | |
| 5,419,406 | A | 5/1995 | Kawamoto et al. | |
| 5,429,558 | A * | 7/1995 | Lagarde | F16H 1/2836 74/462 |
| 5,924,951 | A | 7/1999 | Winzeler et al. | |
| 8,522,634 | B2 | 9/2013 | Bridges | |
| 8,870,712 | B2 | 10/2014 | Steinborn et al. | |
| 9,005,071 | B2 * | 4/2015 | Smemo | F16H 3/66 475/271 |
| 9,254,740 | B2 | 2/2016 | Lamperth | |
| 9,321,342 | B2 | 4/2016 | Liu et al. | |
| 9,447,848 | B2 | 9/2016 | Beck | |
| 9,707,834 | B2 | 7/2017 | Lee et al. | |
| 10,093,168 | B2 | 10/2018 | Hays et al. | |
| 10,408,309 | B2 | 9/2019 | Beck et al. | |
| 10,598,257 | B2 | 3/2020 | Eo et al. | |
| 10,807,466 | B1 | 10/2020 | Haka et al. | |
| 10,882,389 | B2 | 1/2021 | Kucharski | |
| 11,124,064 | B2 | 9/2021 | Kaltenbach et al. | |
| 11,149,833 | B2 | 10/2021 | Maguire et al. | |
| 11,198,356 | B2 | 12/2021 | Brammer et al. | |
| 11,320,025 | B2 | 5/2022 | Ye et al. | |
| 11,338,672 | B2 | 5/2022 | Varela | |
| 11,828,351 | B1 | 11/2023 | Mock et al. | |
| 2004/0121877 | A1 | 6/2004 | Lee et al. | |
| 2005/0023056 | A1 | 2/2005 | Harrup et al. | |
| 2007/0093342 | A1 | 4/2007 | Pesiridis et al. | |
| 2009/0118060 | A1 | 5/2009 | Kirkwood et al. | |
| 2011/0027105 | A1 * | 2/2011 | Haupt | F16H 61/0025 417/326 |
| 2012/0291646 | A1 | 11/2012 | Fan Chiang | |
| 2014/0221149 | A1 | 8/2014 | Wilton et al. | |
| 2014/0349802 | A1 | 11/2014 | Steiner et al. | |
| 2016/0091070 | A1 * | 3/2016 | Park | B60K 6/445 475/5 |
| 2017/0175855 | A1 * | 6/2017 | Etchason | F16H 3/666 |
| 2018/0119784 | A1 | 5/2018 | Cui | |
| 2018/0134140 | A1 | 5/2018 | Brehmer et al. | |
| 2018/0172124 | A1 * | 6/2018 | Valente | B60K 1/00 |
| 2021/0252974 | A1 | 8/2021 | Nakashima | |
| 2021/0291646 | A1 | 9/2021 | Lorenz et al. | |
| 2021/0372506 | A1 | 12/2021 | McGrew, Jr. et al. | |
| 2022/0034385 | A1 | 2/2022 | Beaudoin | |
| 2022/0227370 | A1 | 7/2022 | Desmeules et al. | |
| 2023/0392673 | A1 * | 12/2023 | Mock | F16H 3/62 |

FOREIGN PATENT DOCUMENTS

| | | | | |
|---|---|---|---|---|
| DE | 102010045350 | A1 * | 3/2012 | F16H 3/663 |
| DE | 102017004898 | A1 | 11/2018 | |
| DE | 102017011401 | A1 | 6/2019 | |
| DE | 102018122936 | A1 | 3/2020 | |
| DE | 102018131492 | A1 | 6/2020 | |
| DE | 102019206545 | A1 | 11/2020 | |
| DE | 102019119946 | B3 | 12/2020 | |
| GB | 910653 | | 11/1962 | |
| JP | 2785325 | B2 | 8/1998 | |
| WO | WO-2012053142 | A1 * | 4/2012 | B60K 6/365 |

* cited by examiner 1500
5013
5163
5053
5063
5073
5073
1511
5133
5153
1503
5023
5083
5093
5103
5173
5123
1522
5012
5162
5052
5062
5072
5072
5132
1502
5022
5082
5092
5102
5152
1510
5172
5122
1521
5011
5161
5051
5061
5071
5071
5131
1501
5081
5091
5101
5151
5171
5021
5121
1511

1600
1604
1602
1603
1601
1605
1611
1612
1615
1616
1621
8011
8012
8021
8022
8031
8032
8041
8042
8051
8052
8061
8062
8071
8072
8081
8082
8091
8092
8101
8102
8121
8122
8131
8132
8151
8152
8161
8162
8171
8181
8182
8191
8192

1700
1702
2042
1712
2192
2062
2072
2052
2132
1713
2012
2162
2152
2082
2072
2092
2102
2022
2122
2172
2032
2182
1705
1704
1711
2031
1721
2171
2021
2121
2181
2101
2091
2071
1703
2081
1706
2161
2011
2051
2151
2071
2061
1701
2191
2131
1711

MODULAR TRANSMISSION FOR AN ELECTRIC DRIVE SYSTEM

BACKGROUND

As the electric motor becomes a more common primary power source for vehicles, transmission development has also shifted to accommodate the broader power curve commonly available with such motors. Transmissions configured for internal combustion engines are often unnecessarily complex and inefficient in an electric or hybrid electric drive train. A transmission for an electric vehicle drivetrain can thus be simpler, more modular, and hence more reliable with fewer moving parts.

SUMMARY

Disclosed is a modular transmission for an electric drive system. In one aspect, the disclosed drive system includes multiple individual drive modules. The drive modules optionally include a housing separate and distinct from the housing of other drive modules. In another aspect, the housing optionally defines at least one mount point arranged and configured to interconnect together with mount points of other drive modules. This provides a relatively straightforward architecture by which multiple drive modules may be coupled together to provide a wide array of different gear ratios, both for forward and reverse gears.

In another aspect, the individual drive modules optionally include a planetary gearset mounted within the housing having a sun gear, a carrier with planetary gears, and a ring gear. The sun gear is optionally coupled to an input shaft, and the carrier may be coupled to an output shaft. A shifting assembly may be included that is operable to selectively couple the ring gear either to the carrier, the sun gear, or to ground, to achieve two different gear ratios of the input shaft to the output shaft. In another aspect, the output shaft of an upstream drive module may be arranged and configured to couple to the input shaft of a downstream drive module. In another aspect the overall number of gear ratios obtainable by the transmission containing two speed drive modules is two raised to the Nth power, where N is the number of multiple individual drive modules included in the transmission (e.g. two speeds for transmissions with one drive module, for speeds for transmissions with two drive modules, eight speeds for transmissions with three modules, and so forth).

In another example, a modular transmission of the present disclosure optionally includes multiple individual drive modules mounted in the transmission. The drive modules may include a planetary gearset having a sun gear, a carrier with planetary gears, and a ring gear. In one aspect, the sun gear is coupled to an input shaft, and the carrier is coupled to an output shaft. The disclosed modular transmission optionally includes a shifting assembly operable to selectively couple the ring gear either to the carrier or the sun gear, or to ground, to achieve two different gear ratios of the input shaft relative to the output shaft. Multiple drive modules may be coupled together such that the output shaft of an upstream drive module may be arranged and configured to couple to the input shaft of a downstream drive module for as many additional modules as may be included in the transmission. In another aspect, the disclosed modular transmission may be used as part of an electric drive system optionally including an electric motor arranged and configured to transmit torque to the transmission via an input shaft that is coupled to an input shaft of the first drive module in the drivetrain. In another aspect, a carrier of the last drive module in the drivetrain may be coupled to an output shaft of the transmission, and the output shaft of the transmission may be coupled to a drive axle.

DETAILED DESCRIPTION

Figure 1:
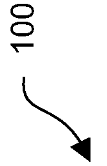
FIG. 1 is a component diagram illustrating one example of the components that may be included in a modular transmission of the present disclosure.
Figure 1:
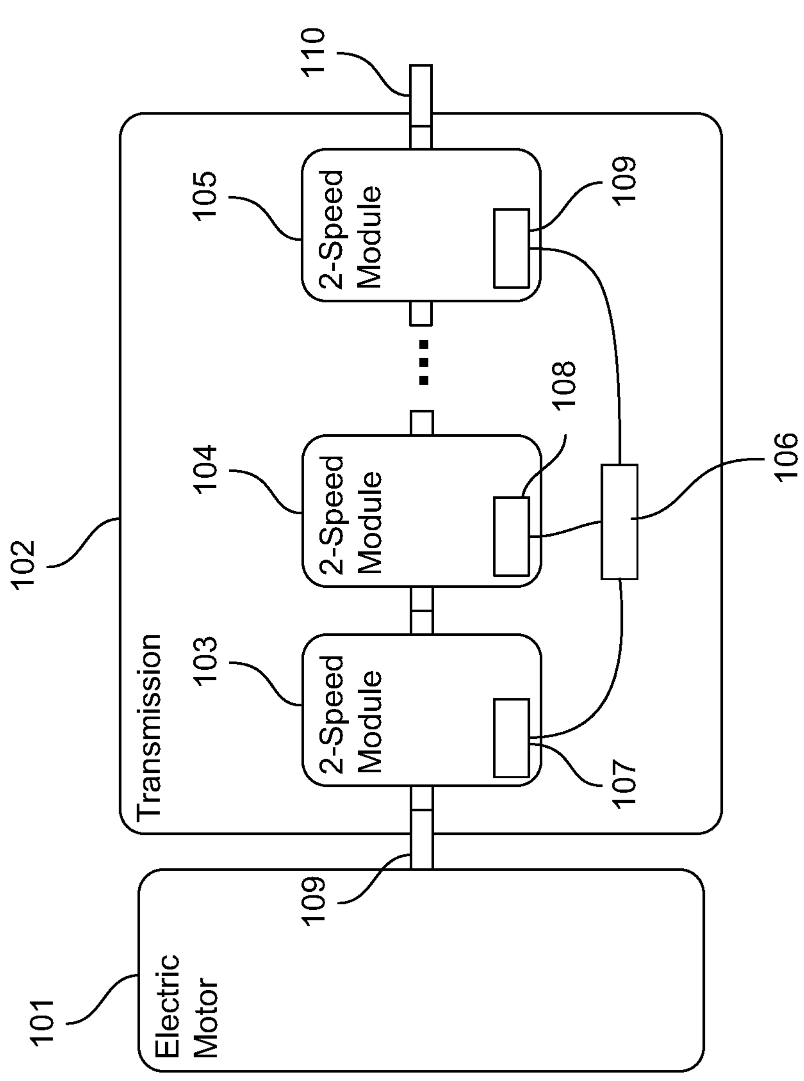

Illustrated in FIG. 1 at 100 is one example of components that may be included in the disclosed modular transmission for an electric drive system. An electric motor 101 is optionally coupled to a transmission 102 of the present disclosure via an input shaft 109 of the transmission. The transmission 102 may include one or more two speed modules 103-105 coupled together such that an input shaft of one module is coupled to an output shaft of an adjacent module. In another aspect, drive modules 103-105 may include planetary gears, clutches, synchronizers, brakes, dog clutches, or other aspects of a shifting assembly useful to shift between two gears. The disclosed modular drivetrain for use with modules 103-105 defines a flexible architecture by which the additional modules may be included thereby increasing the number of gear ratios provided by the transmission by a factor of two with each additional module. In another aspect, drive modules of the present disclosure are optionally configured with separate independent housings with mounting assemblies by which multiple modules may be mounted together without undue effort thus providing an easy way to quickly assemble a drivetrain with known gear ratios and torque transmission characteristics. In another aspect, the disclosed modular drivetrain makes it easier to swap module 103 for a different module, or to change the order of modules 103-105, or to easily disassemble and remove damaged or ineffective modules.

In another aspect, drive modules 103-105 of the present disclosure optionally include control circuits or other controllers 107, 108, 109 that may be specific to each drive module 103-105 respectively. These controllers may be electronic, hydraulic, or of any other suitable type, and may be arranged and configured to control the shifting assemblies within the drive modules 103-105. In another aspect, a transmission controller 106 may be in communication with controllers 107-109 optionally orchestrate the shifting operations by interacting with controllers 107-109. Controllers 107-109 are optionally responsive 2 the transmission controller 106, and vice versa so that the overall operation of the transmission 102 may proceed smoothly.

Figure 2:
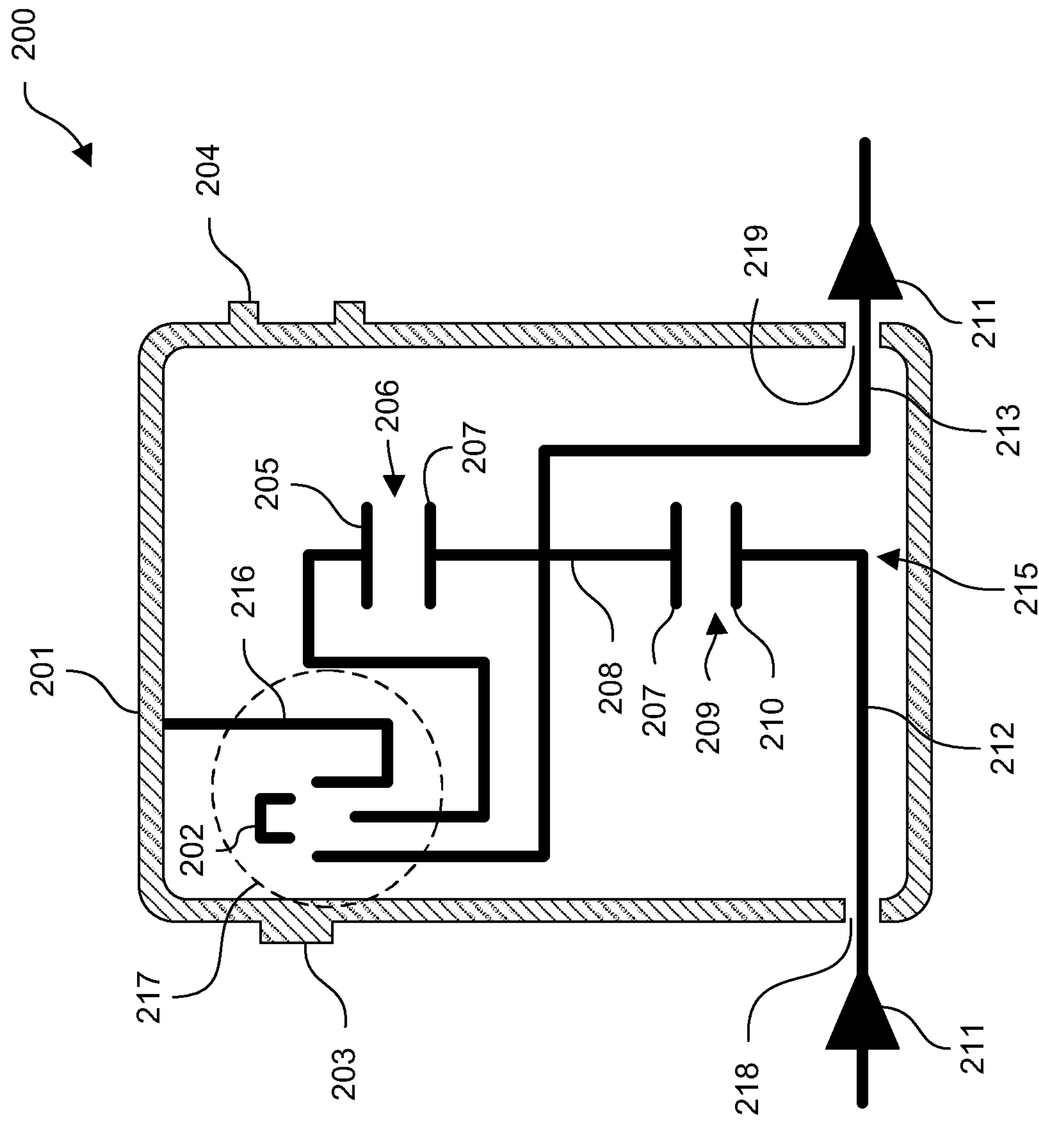
FIG. 2 is a diagram illustrating one example of the components of a drive module of the present disclosure.

Illustrated at 200 in FIG. 2 is one example of the components and configuration of a drive module that may be included in a modular transmission or a drivetrain according to the present disclosure. In one aspect, the drive module 200 optionally includes a planetary gearset 215 mounted in a housing 201 that at least partially encloses the gearset 215, and optionally operates as a mechanical ground. An input shaft 212 optionally provides torque to the gearset 215 and may enter the housing 201 via an opening 218 defined by the housing. An output shaft 213 optionally passes through another different opening 219 defined by the housing 201 to carry torque downstream from the module 200. The housing 201 may be separate and distinct from the housing of other drive modules that may be included in a transmission of the present disclosure. The housing 201 may include or define one or more mount points 203 and 204 arranged and configured to interconnect together with mount points of other drive modules that may be included in a transmission or drive system of the present disclosure. Any suitable mount point configuration may be used, such as corresponding projections and indentations, holes, or other indexing elements. The mount points may include any suitable fasteners such as bolts, screws, clips, and the like.

Multiple individual drive modules may be easily coupled together to provide multiple different overall gear ratios. As disclosed herein, the individual drive modules are optionally configured to provide a first and second gear. Thus combining multiple such modules in a transmission, drive system, or drivetrain of the present disclosure means that the overall number of gear ratios between the input shaft of the first upstream module, and output shaft of the last downstream module is equal to two (the number of gear ratios per module) raised to the Nth power, where N is the number of multiple individual drive modules included in the overall drivetrain (i.e. two gears using one module, four gears using two modules, eight gears using three modules, 16 gears using four modules, and so on).

In another aspect, a motor may be mounted upstream of the module 200 so that when the motor is providing power to the module 200, power flows downstream from left to right in FIG. 2 according to arrows 211. In this instance, power is received at the sun gear, and transferred out from the carrier. In another aspect, power optionally flows opposite the arrows 211 when, for example, the drivetrain is providing power to the motor. This may occur when the module 200 is coupled to an electric motor generator in a vehicle while the vehicle is decelerating causing the motor generator to advantageously capture power during regenerative braking. Operating this way, power is received at the carrier, and transferred out from the sun gear.

In another aspect, the gearset 215 may include a sun gear 210, a carrier 208 with planetary gears 207, and a ring gear 205. In the gearset 215, the planetary gears 207 are optionally arranged and configured to engage the ring gear 205 at 206, and the sun gear 210 at 209.

The drive module 200 optionally includes a shifting assembly 217 that, in this example, optionally includes a synchronizer 202 that may be arranged and configured or otherwise operable to selectively couple the ring gear 205 of the gearset 215 either to the carrier 208 of the gearset or to a ground 216. In another aspect, the sun gear 210 of the gearset 215 is optionally coupled to an input shaft 212, and the carrier 208 is optionally coupled to an output shaft 213. Mechanical ground 216 may be provided by other structural components of the disclosed drivetrain such as by a housing 201 that optionally at least partially surrounds the gearset 215. Any suitable combination of clutches, brakes, synchronizers, and the like may be used in the shifting assembly 217 to achieve this result.

In a first mode of operation, synchronizer 202 is optionally configured to couple the carrier to the ring gear 205. In this configuration, the synchronizer 202 optionally forces the ring gear 205 and the carrier 208 to rotate together. In a second mode of operation, synchronizer 202 is optionally configured to couple the ring gear 205 to ground 216, thus effectively locking up the ring gear 205 to hold it stationary with respect to other rotating elements of the gearset 215. Thus, two separate gear ratios are possible based on the first and second modes of the shifting mechanism 217 as illustrated in Table 1 below:

TABLE 1

| | | Synchronizer 202 | |
|---|---|---|---|
| | | 1st Mode | 2nd Mode |
| Gear | 1st | | X |
| | 2nd | X | |

In another aspect, a first gear is optionally defined when the ring gear 205 is coupled to ground 216. In one example, this is achievable by operating the synchronizer 202 in the second operating mode. The resulting first gear ratio of the two separate gear ratios may be of any suitable ratio such as less than or equal to 3:1, greater than 3:1, greater than 5:1, greater than 7:1, greater than 10:1, or more.

In another aspect, a second gear is optionally defined by coupling ring gear 205 to the carrier 208. This is achievable by operating the synchronizer 202 in the first mode of operation. This may provide a second gear of any suitable ratio such as less than or equal to 2:1, greater than 2:1, greater than 4:1, greater than 6:1, greater than 8:1, or more.

A wide range of gear ratios may be achieved based on the power output available from the motor coupled to the input shaft and the sizes and arrangement of the gears in the planetary gear set. In another aspect, two reverse gears may be obtained by driving the motor coupled to the input shaft 212 in reverse. The drive module 200 thus optionally provides reverse gears with the same gear ratios as the forward gears but without the additional complexity of a reverser. In another aspect, a neutral gear may be provided by disengaging the synchronizer 202.

Figure 3:
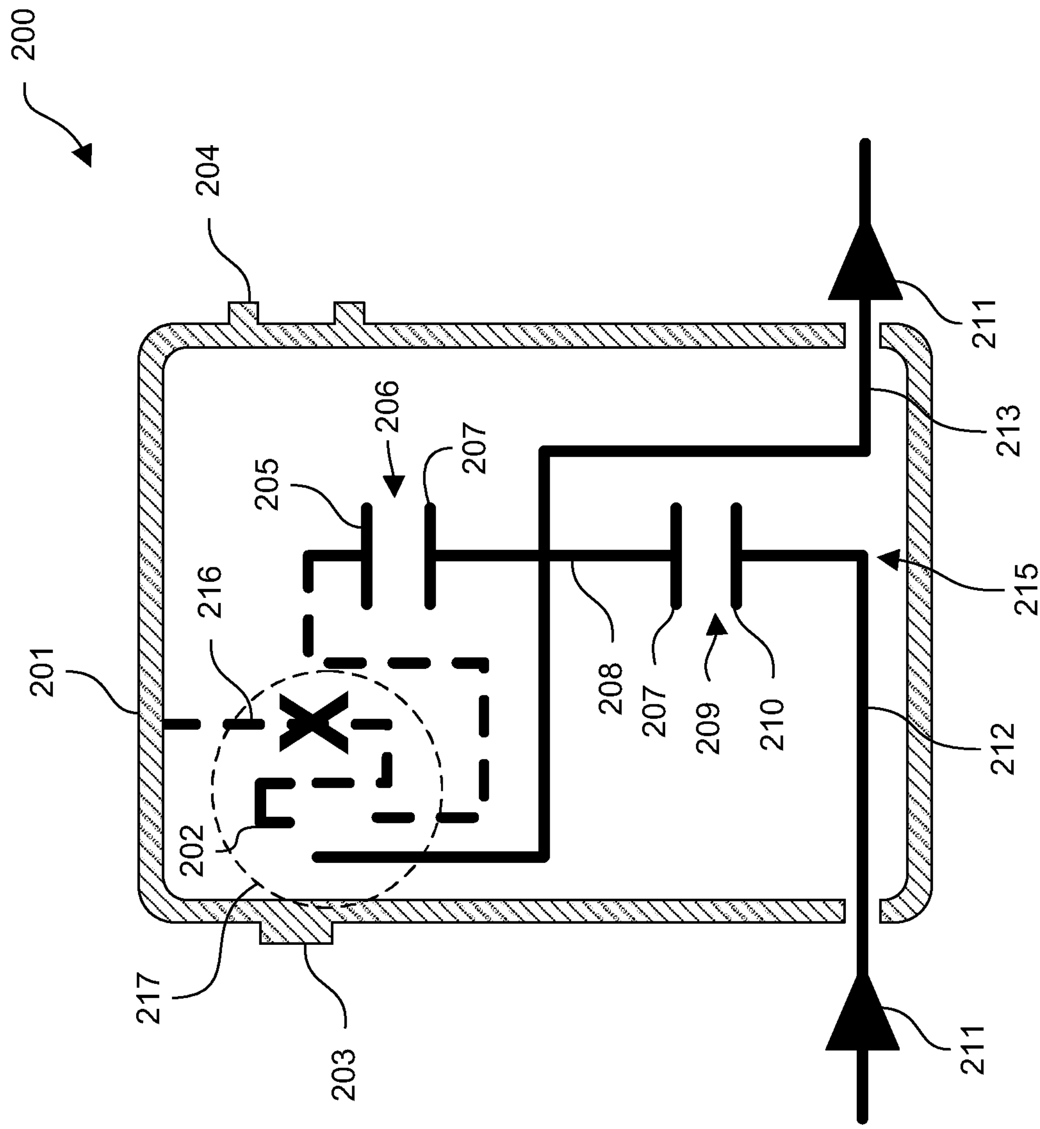
FIG. 3 is a diagram illustrating the example of FIG. 2 in operation.
Figure 4:
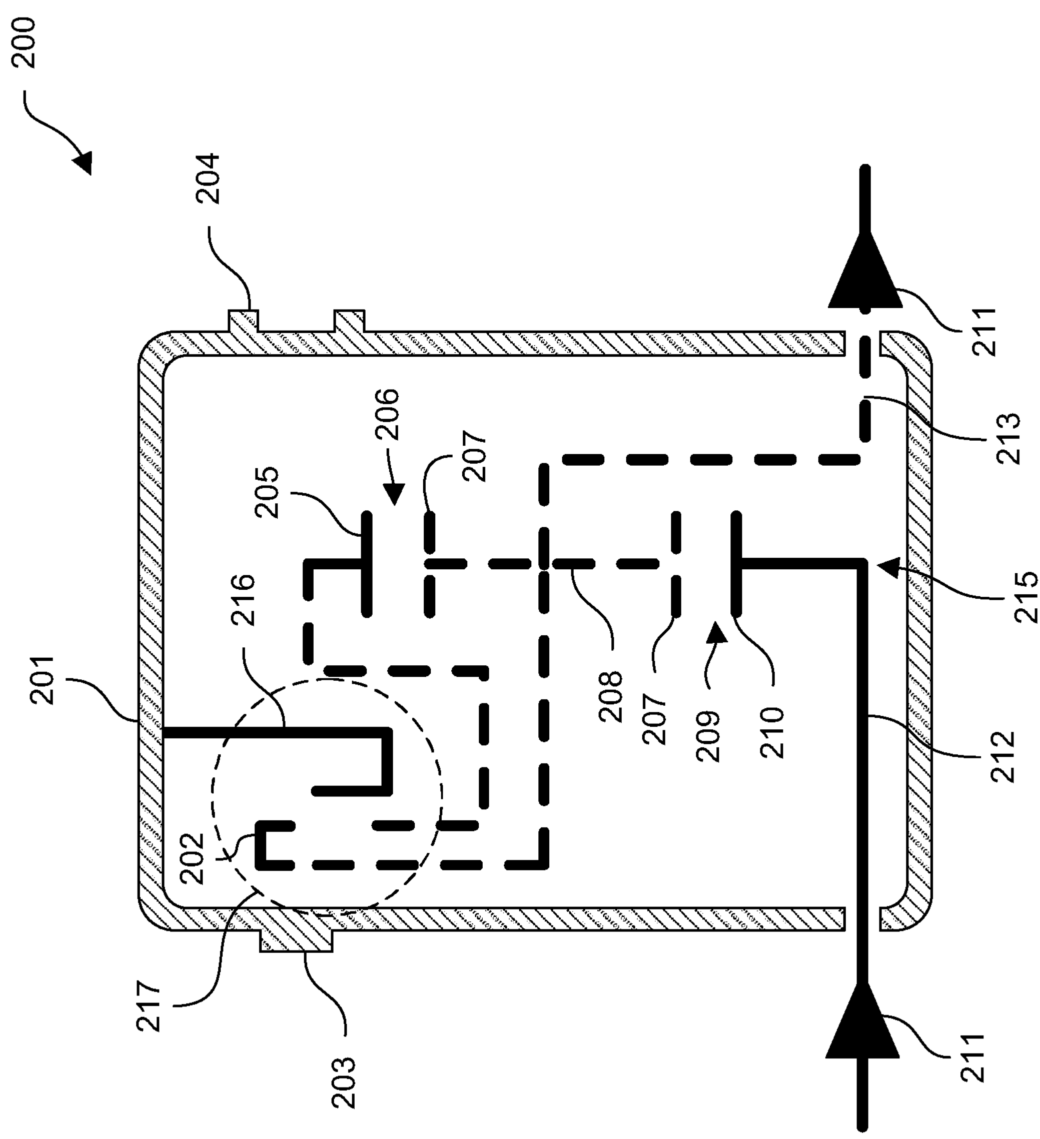
FIG. 4 is another diagram illustrating the example of FIG. 2 in operation.

The drive module of FIG. 2 is shown in operation in FIGS. 3 and 4. In these figures, parts indicated with similar dashed lines are constrained to rotate together, while parts in solid lines rotate independently or not at all. Parts marked with an "X" are constrained from rotating and are thus grounded.

In FIG. 3, the synchronizer 202 is actuated to ground the ring gear 205. This means that the ring gear 205 is maintained in place relative to the mechanical ground 216 and is thus not allowed to rotate relative to the housing 201 of the drive module. The sun gear 210 provides input torque to the gearset 215, and the carrier 208 and the planetary gears 207 are thus allowed to rotate freely in relation to the ring gear 205 and sun gear 210. In this way power can transfer from a motor, downstream through the drive module, to the output shaft 213 to provide a first gear ratio.

In FIG. 4, the synchronizer 202 is actuated to couple the carrier 208 to the ring gear 205. This means that the ring gear 205 and the carrier 208 rotate together relative to the sun gear 210. The sun gear 210 provides input torque to the gearset 215. The carrier 208 and the ring gear 205 are thus allowed to optionally rotate freely. Torque is transferred to the output shaft 213 via the carrier 208. In this way power can transfer from a motor, downstream through the drive module, to the output shaft 213 to provide a second gear ratio.

Figure 5:
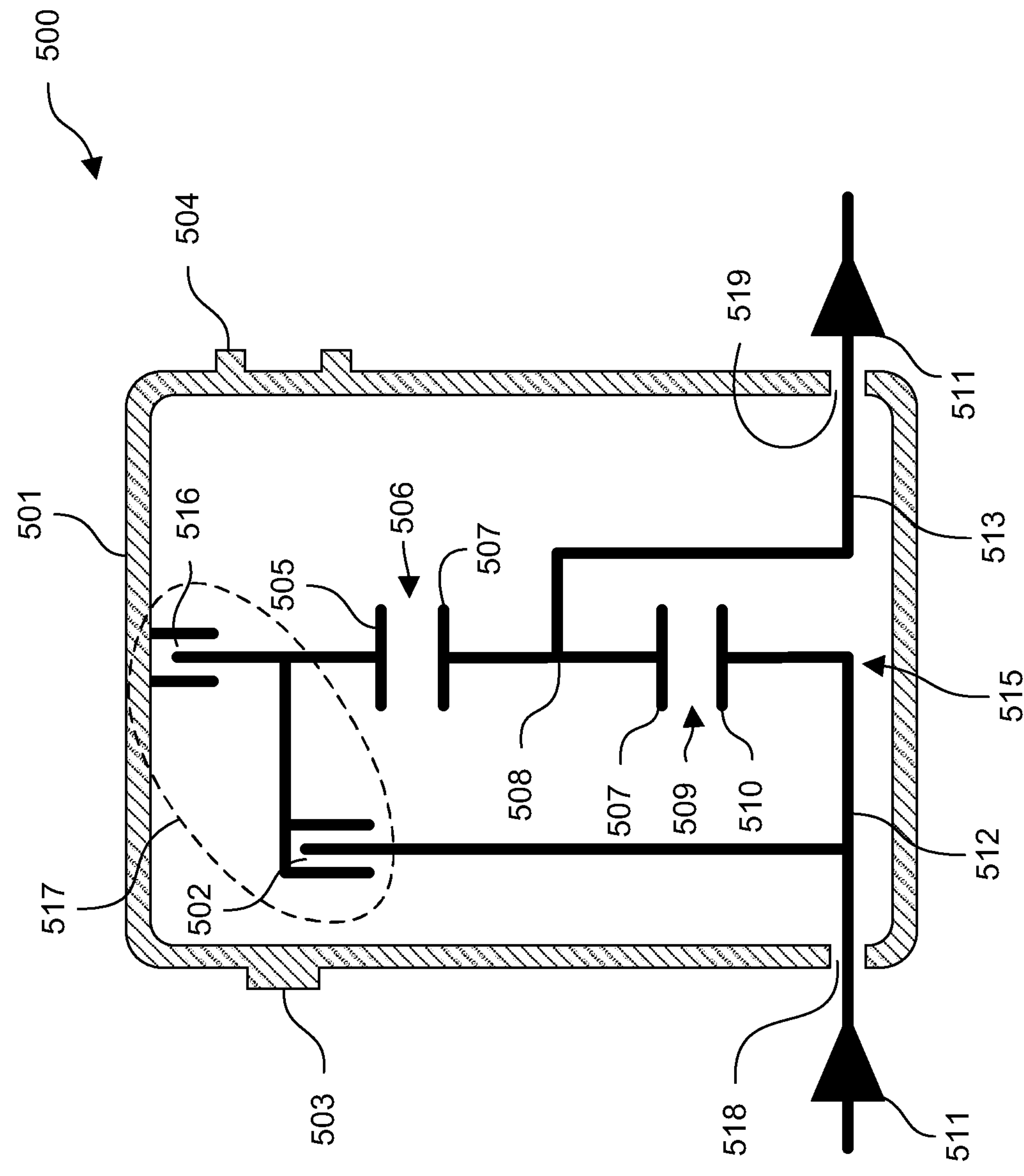
FIG. 5 is a diagram illustrating components of another example of a drive module of the present disclosure.

Illustrated at 500 in FIG. 5 is another example of a drive module that may be included in a modular transmission or drivetrain according to the present disclosure. In one aspect, the drive module 500 optionally includes a planetary gearset 515 mounted in a housing 501 that at least partially encloses the gearset 515. In another aspect, housing 501 optionally operates as a mechanical ground for the internal components of the drive module. An input shaft 512 optionally providing torque to the gearset 515 may enter the housing 501 through an opening 518 defined by the housing. An output shaft 513 optionally passes through a second opening 519 defined by the housing 501 in order to deliver torque downstream to the rest of the drivetrain beyond module 500. The housing 501 may be advantageously separate and distinct from the housing of other drive modules that may be included in a transmission of the present disclosure.

The housing 501 may include or define one or more mount points 503 and 504 arranged and configured to interconnect together with mount points of other drive modules such as mount points 203 and 204 shown in FIG. 2, and others like them, that may be included in a transmission or drive system of the present disclosure. Any suitable mount point configuration may be used, such as corresponding projections and indentations, holes, or other indexing elements. The mount points may include any suitable fasteners such as bolts, screws, clips, and the like.

In another aspect, a motor may be mounted upstream of the module 500 so that when the motor is providing power to the module 500 via input shaft 512, power flows from left to right in FIG. 5 according to arrows 511. When operating this way, power is received at the sun gear, and optionally at the ring gear, and then transferred out from the drive module from the carrier. In another aspect, power optionally flows opposite the arrows 511 when, for example, the drive module is providing power to the motor. This may, for example, occur when the module 500 is coupled to an electric motor generator in a vehicle while the vehicle is decelerating. The motor generator in this situation may advantageously use regenerative braking to both slow the vehicle and capture the energy as electricity. In this mode of operation, power is received by the drive module at the carrier, and transferred out via the sun gear, and optionally the ring gear as well.

In another aspect, the gearset 515 may include a sun gear 510, a carrier 508 with planetary gears 507, and a ring gear 505. In the gearset 515, the planetary gears 507 are optionally arranged and configured to engage the ring gear 505 at 506, and the sun gear 510 at 509.

The drive module 500 optionally includes a shifting assembly 517 that, in this example, optionally includes a clutch 502 and a brake 516. The clutch 502 and the brake 516 may be arranged and configured or otherwise operable to selectively couple the ring gear 505 of the gearset 515 either to the input shaft 512 (and by extension to the sun gear 510), or to a mechanical ground (such as housing 501). In another aspect, the sun gear 510 of the gearset 515 is optionally coupled to an input shaft 512 and is selectively engageable with the ring gear 505 via the clutch 502. The carrier 508 is optionally coupled to an output shaft 513. Any suitable combination of clutches, brakes, synchronizers, and the like may be used in the shifting assembly 517 to achieve this configuration.

In a first mode of operation, clutch 502 is optionally configured to couple the ring gear 505 to the input shaft 512 and to the sun gear 510. In this configuration, the clutch 502 optionally forces the ring gear and the sun gear to rotate together with the input shaft. In a second mode of operation, brake 516 is optionally configured to couple the ring gear 505 to ground, thus effectively locking the ring gear 505 keeping it stationary with respect to other rotating elements of the gearset 515. Preferably, drive module 500 is configured such that clutch 502 and brake 516 are not engaged at the same time while torque is transferred to the input shaft.

According to this configuration, drive module 500 provides two separate gear ratios based on different available modes of the shifting mechanism 517 as illustrated in Table 2 below:

TABLE 2

| | | Clutch 502 | Brake 516 |
|---|---|---|---|
| Gear | 1st | | X |
| | 2nd | X | |

In another aspect, a first gear is optionally defined when the ring gear 505 is coupled to ground and clutch 502 remains disengaged. The resulting first gear ratio of the two separate gear ratios may be of any suitable ratio such as less than or equal to 3:1, greater than 3:1, greater than 5:1, greater than 7:1, greater than 10:1, or more.

In another aspect, a second gear is optionally defined by coupling the ring gear 505 to the input shaft 512 and the sun gear 510. This is achievable by disengaging the brake 516, and engaging the clutch 502. This may provide a second gear of any suitable ratio such as less than or equal to 2:1, greater than 2:1, greater than 4:1, greater than 6:1, greater than 8:1, or more.

In another aspect, a neutral gear may be provided by disengaging both the clutch 502 and the brake 516. A wide range of gear ratios may be achieved based on the relative sizes and arrangement of the gears in the planetary gear set 515.

In another aspect, the drive module 500 is optionally configured to provide as many reverse gears as forward gears. A first and second reverse gear may be obtained by driving the motor coupled to the input shaft 512 in reverse and actuating the clutch 502 and the brake 516 according to Table 2. The drive module 500 thus optionally provides reverse gears with the same gear ratios as the forward gears but without the additional complexity of a reverser.

Figure 6:
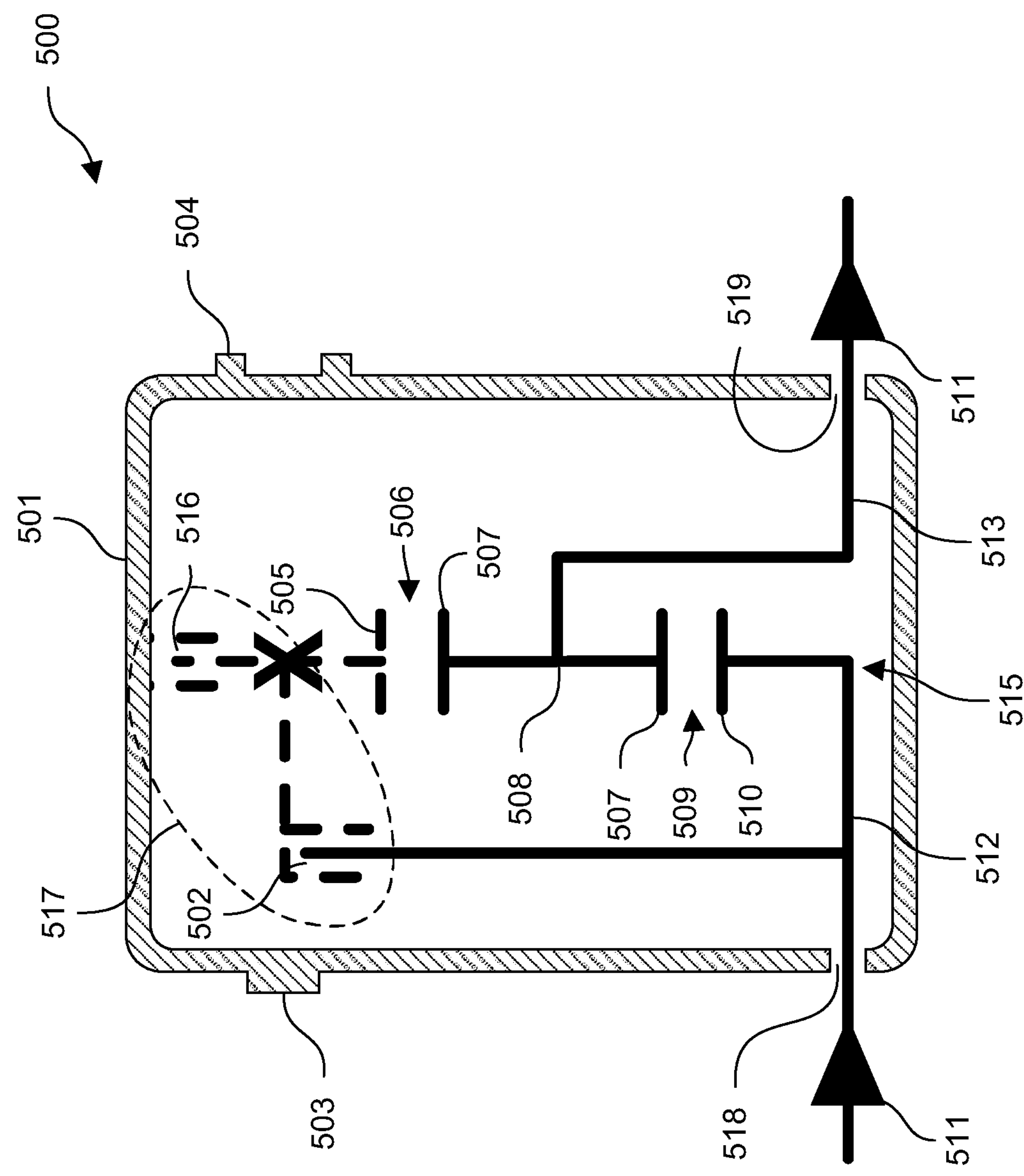
FIG. 6 is a diagram illustrating the example of FIG. 5 in operation.
Figure 7:
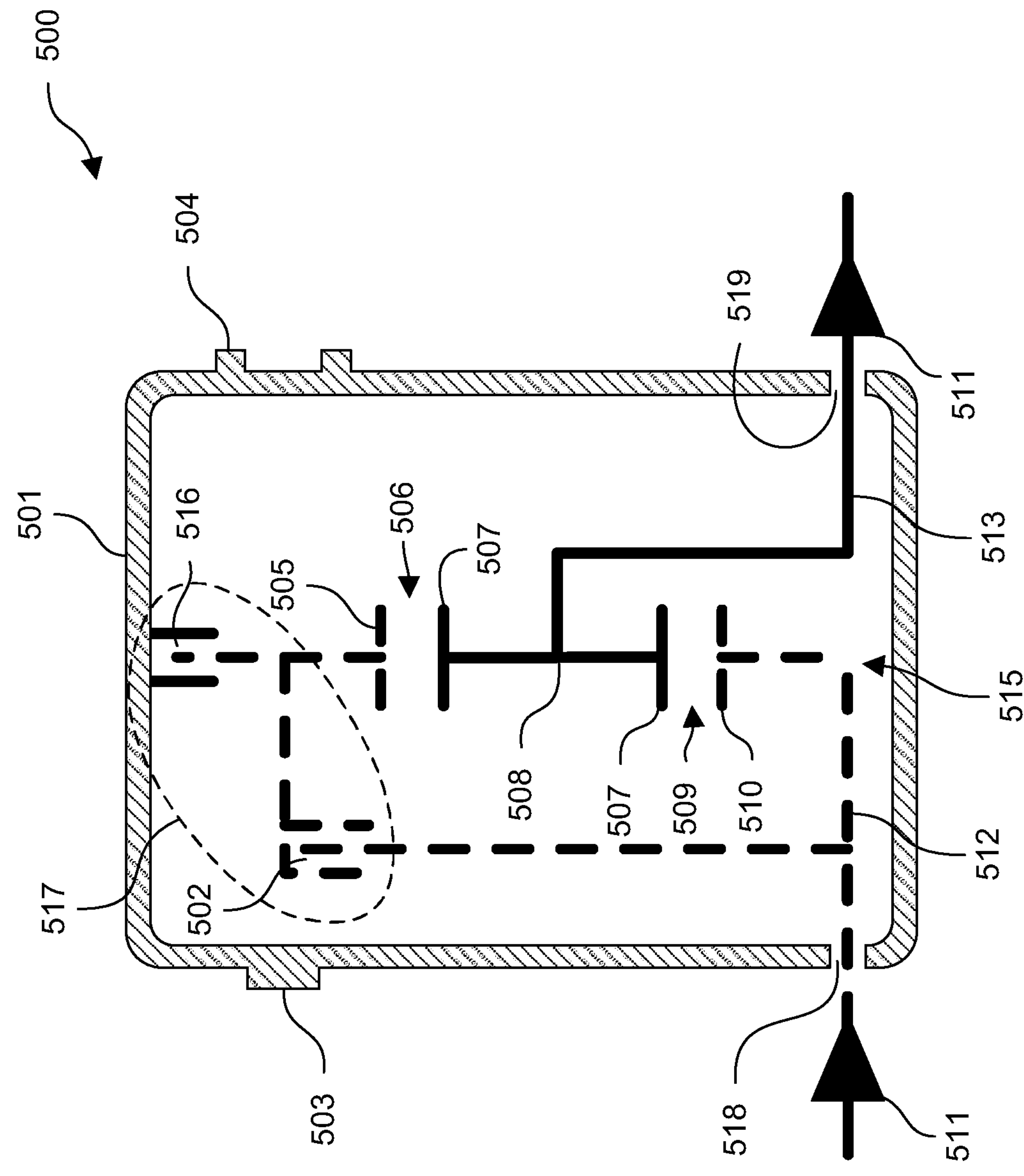
FIG. 7 is another diagram illustrating the example of FIG. 5 in operation.

The drive module of FIG. 5 is shown in operation in FIGS. 6 and 7. In these figures, parts indicated with similar dashed lines are constrained to rotate together, while parts in solid lines rotate independently or not at all. Parts marked with an "X" are constrained from rotating and are thus grounded.

In FIG. 6, the brake 516 is engaged to ground the ring gear 505 to the housing while clutch 502 remains deactivated. This means that the ring gear 505 is maintained in place and is not allowed to rotate relative to the housing 501 of the drive module. The sun gear 510 provides input torque to the gearset 515, and the carrier 508 and the planetary gears 507 are thus allowed to rotate freely in relation to the ring gear 505 and sun gear 510. In this way power moves downstream through the drive module according to the arrows 511 to provide a first gear ratio.

In FIG. 7, the clutch 502 is actuated to couple the input shaft 512 to the carrier 505 and the sun gear 510. In this configuration, the ring gear 505 and the sun gear 510 rotate together with the input shaft. Torque is transferred to the output shaft 513 via the carrier 508. In this way power transfers through the drive module and downstream via the output shaft 513 to provide a second gear ratio.

Figure 8:
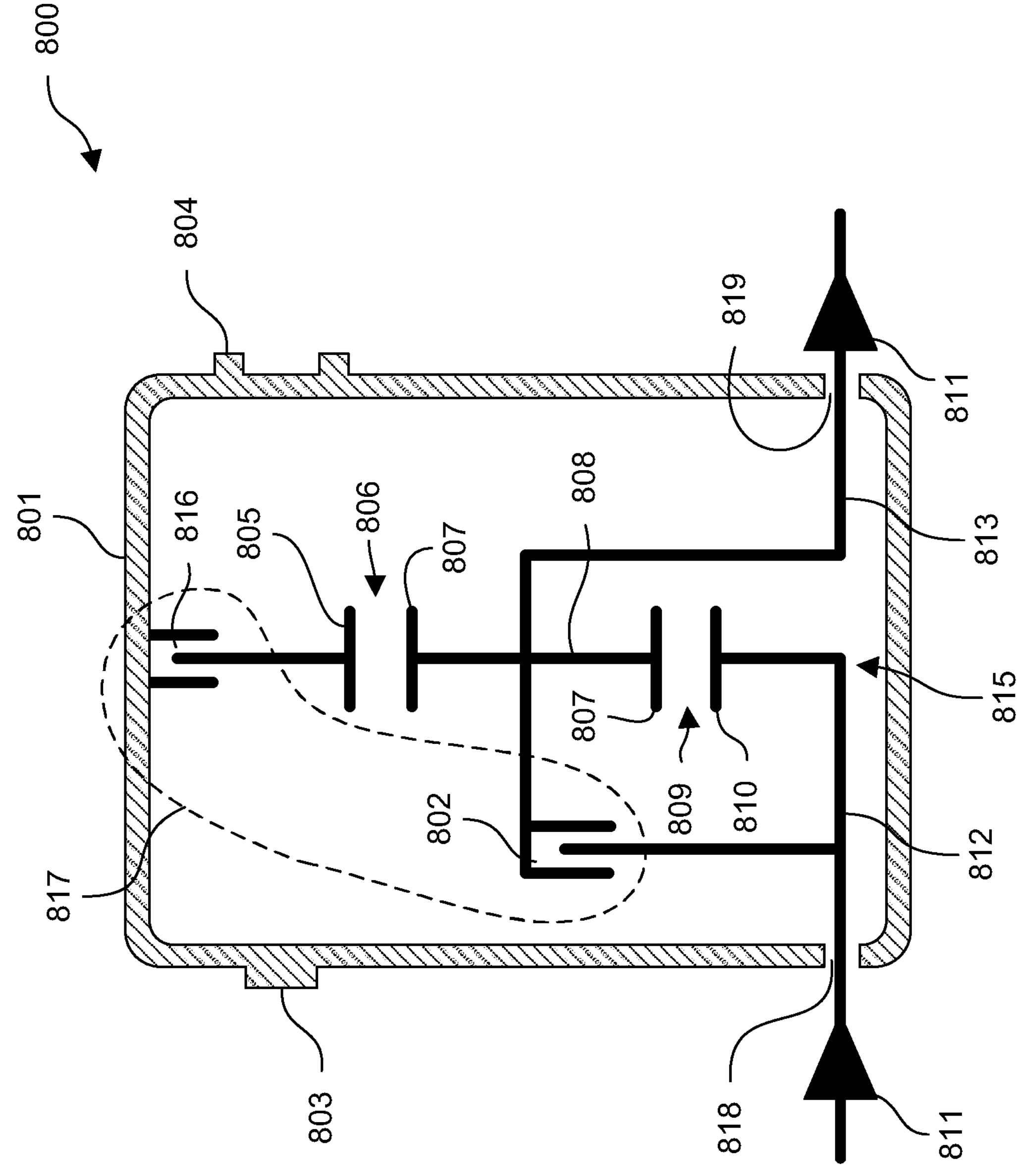
FIG. 8 is a diagram illustrating components of another example of a drive module of the present disclosure.

Illustrated at 800 in FIG. 8 is another example of a drive module of the present disclosure. The drive module 800 optionally includes a planetary gearset 815 mounted in a housing 801 that at least partially encloses the gearset 815. In another aspect, housing 801 optionally serves to provide a mechanical ground for the internal components of the drive module. An input shaft 812 optionally provides torque to the gearset 815 and may enter the housing 801 through an opening 818 defined by the housing. An output shaft 813 also optionally passes through a second opening 819 defined by the housing 801 in order to deliver torque downstream from the module 800 to other modules, or to other components of the drivetrain. The housing 801 may be advantageously separate and distinct from the housing of other drive modules that may be included in a transmission of the present disclosure.

The housing 801 may include or define one or more mount points 803 and 804 arranged and configured to interconnect together with mount points of other drive modules such as mount points 203 and 204 shown in FIG. 2, or mount points 503 and 504, shown in FIG. 5, and others like them that may be included in a transmission or drive system of the present disclosure. In another aspect, the drive modules of the present disclosure are optionally advantageously arranged with corresponding mount points so that any two of the disclosed modules may be easily coupled together in a drive system of the present disclosure. Any suitable mount point configuration may be used, such as corresponding projections and indentations, holes, or other indexing elements. The mount points may include any suitable fasteners such as bolts, screws, clips, and the like.

In another aspect, a motor may be mounted upstream of the module 800 so that when the motor is providing power to the module 800 via input shaft 812, power flows from left to right in FIG. 8 according to arrows 811. In this example, power is received into the drive module 800 at the sun gear, and optionally at the carrier, and transferred out from the carrier. In another aspect, power optionally flows opposite the arrows 811 when, for example, the drive module is providing power to the motor. This may, for example, occur when the module 800 is coupled to an electric motor generator in a vehicle while the vehicle is decelerating. The motor generator in this situation may advantageously use regenerative braking to both slow the vehicle and capture the energy as electricity. In this example, power is received at the carrier, and transferred out from the sun gear (and optionally from the carrier as well).

In another aspect, the gearset 815 may include a sun gear 810, a carrier 808 with planetary gears 807, and a ring gear 805. In the gearset 815, the planetary gears 807 are optionally arranged and configured to engage the ring gear 805 at 806, and the sun gear 810 at 809.

The drive module 800 optionally includes a shifting assembly 817 that, in this example, optionally includes a clutch 802 and a brake 816 that may be arranged and configured or otherwise operable to selectively couple the ring gear 805 of the gearset 815 to a ground (such as housing 801). In another aspect, the shifting assembly 817 is operable to selectively couple the sun gear 810 and the input shaft 812 to the carrier 808 via the clutch 802. Any suitable combination of clutches, brakes, synchronizers, and the like may be used in the shifting assembly 817 to achieve this result.

In a first mode of operation, clutch 802 is optionally configured to engage thus coupling the input shaft 812 and the sun gear 810 to the carrier 808. In this configuration, the clutch 802 optionally forces the carrier and the sun gear to rotate together with the input shaft. In a second mode of operation, brake 816 is optionally configured to couple the ring gear 805 to ground, thus effectively locking the ring gear 805 and holding it stationary with respect to other rotating elements of the gearset 815. Preferably, drive module 800 is configured such that clutch 802 and brake 816 are not engaged at the same time while torque is transferred to the input shaft (or to the output shaft).

According to this configuration, the drive module 800 provides two separate gear ratios based on two different modes of the shifting mechanism 817 as illustrated in Table 3 below:

TABLE 3

| | | Clutch 802 | Brake 816 |
|---|---|---|---|
| Gear | 1st | | X |
| | 2nd | X | |

In another aspect, a first gear is optionally defined when the ring gear 805 is coupled to ground by actuating clutch 816 while clutch 802 remains disengaged. The resulting first gear ratio of the two separate gear ratios may be of any suitable ratio such as less than or equal to 3:1, greater than 3:1, greater than 8:1, greater than 7:1, greater than 10:1, or more.

In another aspect, a second gear is optionally defined by coupling the carrier 808 to the input shaft 812 and the sun gear 810. This is achievable by disengaging the brake 816, and engaging the clutch 802. This may provide a second gear of any suitable ratio such as less than or equal to 2:1, greater than 2:1, greater than 4:1, greater than 6:1, greater than 8:1, or more.

In another aspect, a neutral gear may be provided by disengaging both the clutch 802 and the brake 816. A wide range of gear ratios may be achieved based on the sizes and arrangement of the gears in the planetary gear set 815.

In another aspect, the drive module 800 is optionally configured to provide as many reverse gears as forward gears. Two reverse gears may be obtained by driving the motor coupled to the input shaft 812 in reverse while activating and deactivating the clutch 802 and brake 816 as discussed above. The drive module 800 thus optionally provides reverse gears with the same gear ratios as the forward gears but without the additional complexity of a reverser.

Figure 9:
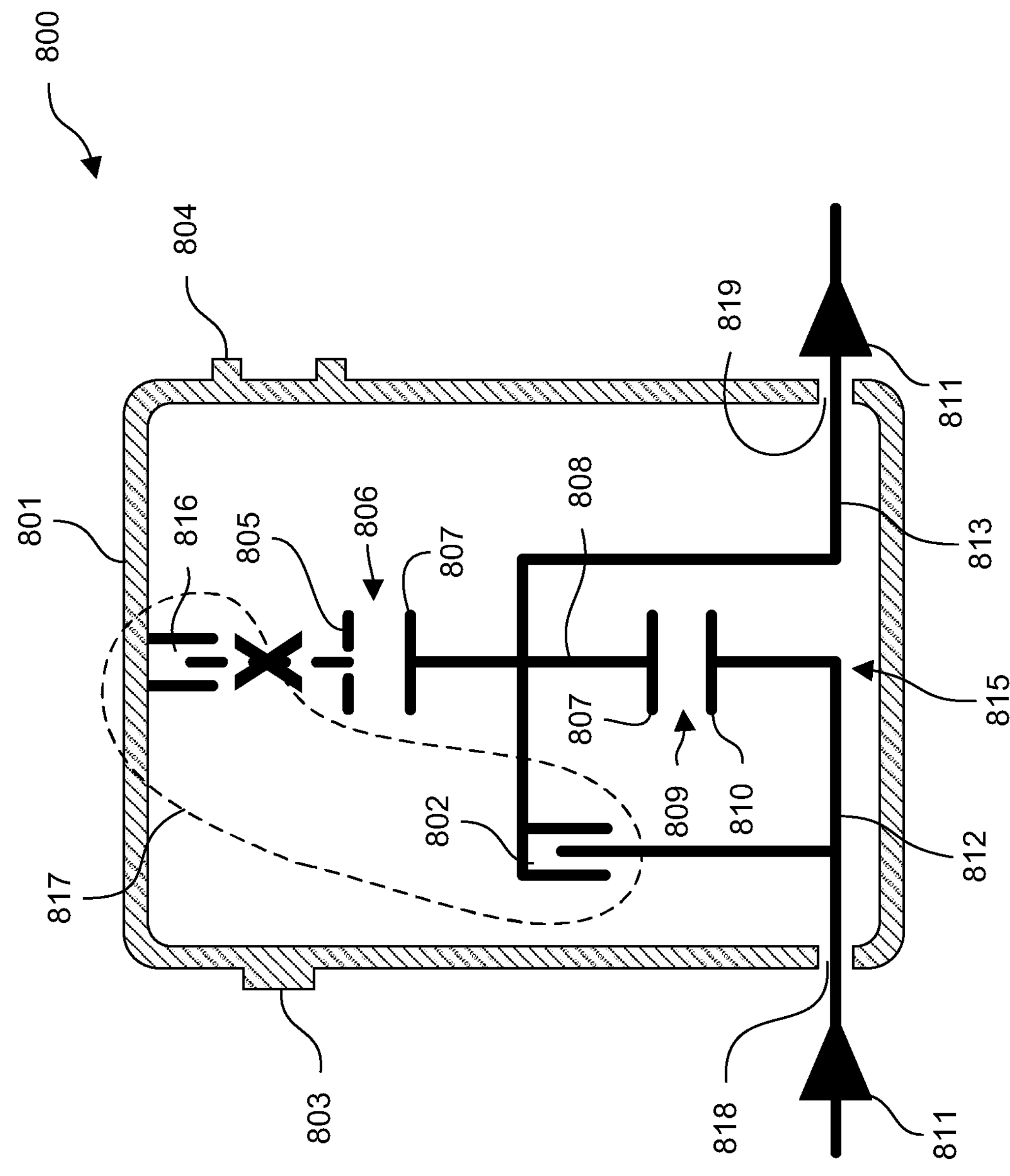
FIG. 9 is a diagram illustrating the example of FIG. 8 in operation.
Figure 10:
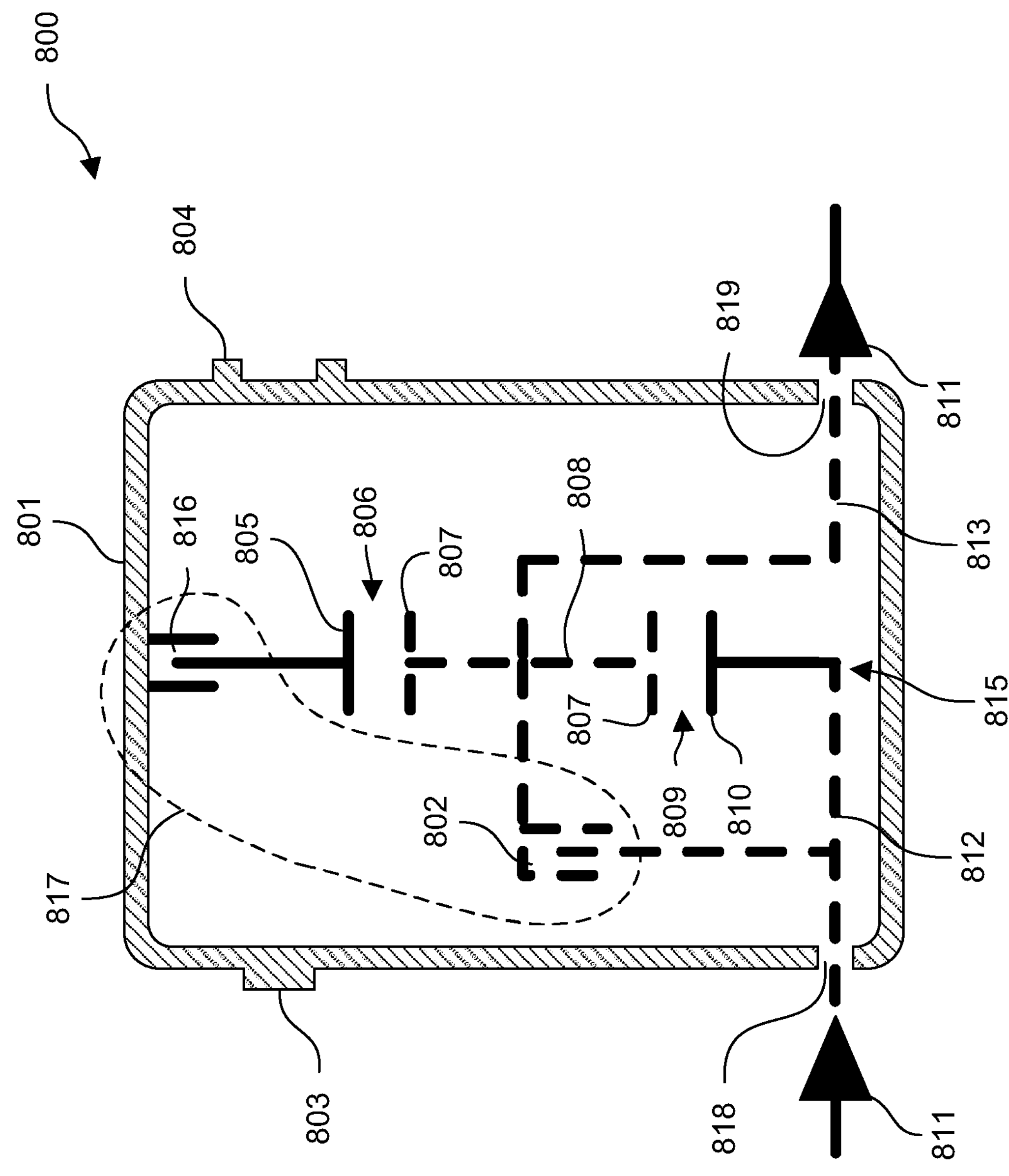
FIG. 10 is another diagram illustrating the example of FIG. 8 in operation.

The drive module of FIG. 8 is shown in operation in FIGS. 9 and 10. In these figures, parts indicated with similar dashed lines are constrained to rotate together, while parts in solid lines rotate independently or not at all. Parts marked with an “X” are constrained from rotating and are thus grounded.

In FIG. 9, the brake 816 is engaged to ground the ring gear 805 to the housing while clutch 802 remains deactivated. This arrangement holds the ring gear 805 in place so that it is not allowed to rotate relative to the housing 801 of the drive module. The sun gear 810 provides input torque to the gearset 815, and the carrier 808 and the planetary gears 807 are thus allowed to rotate freely in relation to the ring gear 805 and sun gear 810. In this way power is supplied downstream through the drive module according to the arrows 811 to provide a first gear ratio.

In FIG. 10, the clutch 802 is actuated to couple the input shaft 812 to the carrier 808 and the sun gear 810. Brake 816 is released. In this configuration, the carrier 808 and the sun gear 810 rotate together with the input shaft 812. The output torque is transferred to the output shaft 813 via the carrier 808. In this way power moves downstream through the drive module, to the output shaft 813 to provide a second gear ratio.

Figure 11:
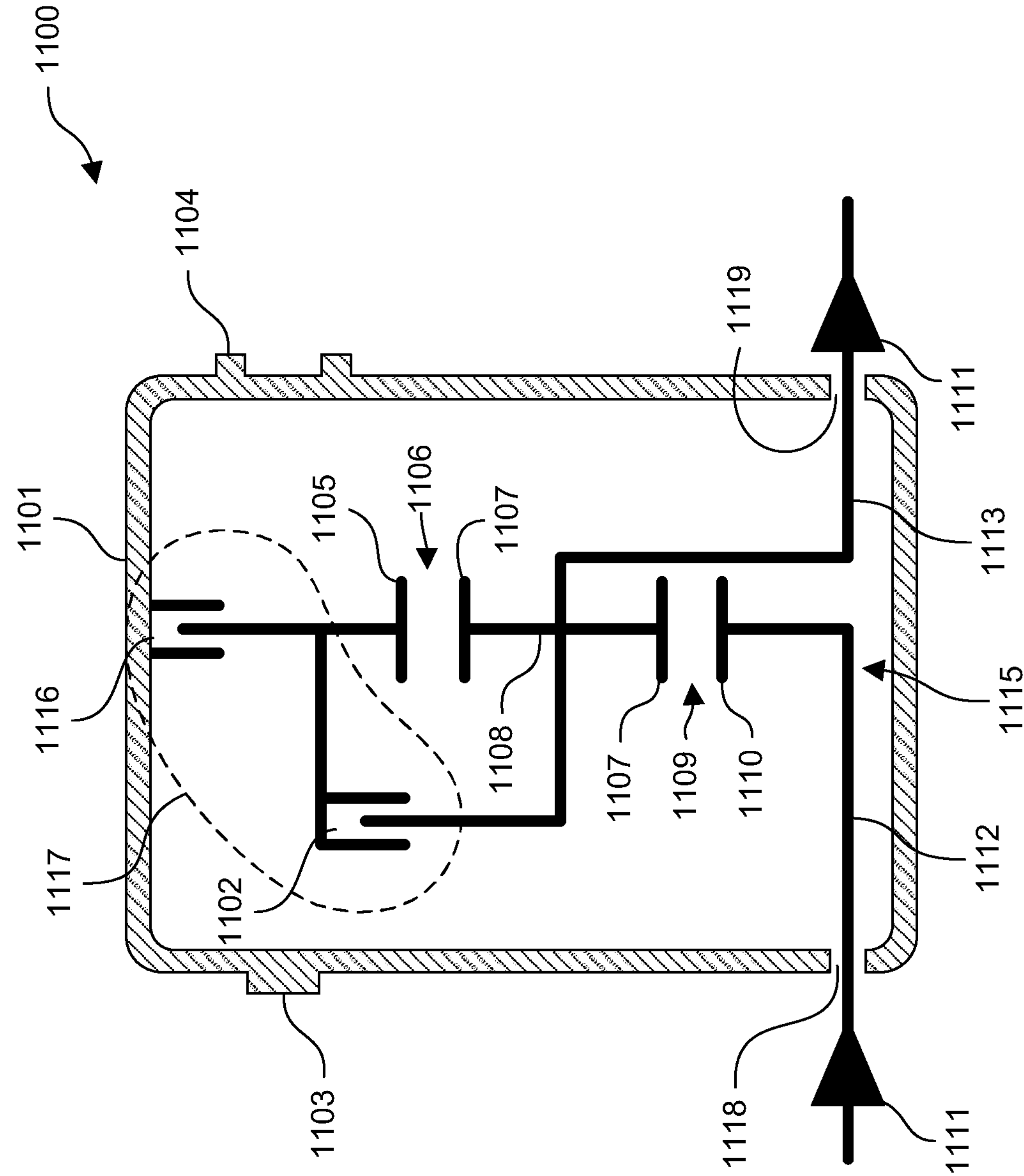
FIG. 11 is a diagram illustrating components of another example of a drive module of the present disclosure.

Illustrated at 1100 in FIG. 11 is yet another example of a drive module that may be included in a modular transmission or drivetrain according to the present disclosure. In one aspect, the drive module 1100 optionally includes a planetary gearset 1115 mounted in a housing 1101 that at least partially encloses the gearset 1115. In another aspect, housing 1101 may be configured as a mechanical ground for holding some of the internal components of the drive module in place. An input shaft 1112 optionally provides torque to the gearset 1115. This input shaft 1112 may enter the housing 1101 through an opening 1118 defined by the housing. An output shaft 1113 optionally passes through a second opening 1119 defined by the housing 1101 in order to deliver torque downstream from the module 1100. The housing 1101 may be advantageously separate and distinct from the housing of other drive modules that may be included in a transmission of the present disclosure.

The housing 1101 may include or define one or more mount points, examples of which are shown at 1103 and 1104. These mount points are optionally arranged and configured to interconnect together with mount points of other drive modules such as mount points 203 and 204 shown in FIG. 2, and others like them shown in FIG. 5, and FIG. 8. By using similar complementary mounting interfaces, the drive modules of the present disclosure may be arranged and configured so that drive modules of the present disclosure may be included in a transmission or drive system without undue modification. Any suitable mount point configuration may be used, such as corresponding projections and indentations, holes, or other indexing components. The mount points may also include any suitable fasteners such as threaded studs, bolts, screws, clips, and the like.

In another aspect, a motor may be mounted upstream of the module 1100 so that when the motor is providing power to the module 1100 via input shaft 1112, power flows downstream from left to right in FIG. 11 according to arrows 1111. When operating this way, power is received at the sun gear and is transferred out from the drive module from the carrier. In another aspect, power optionally flows opposite the arrows 1111 when, for example, the drive module is providing power upstream to the motor. This may, for example, occur when the module 1100 is coupled to an electric motor generator in a vehicle while the vehicle is decelerating. The motor generator in this situation may advantageously use regenerative braking to both slow the vehicle and capture the energy as electricity. In this mode of operation, power is received by the drive module at the carrier, and transferred out via the sun gear.

In another aspect, the gearset 1115 may include a sun gear 1110, a carrier 1108 with planetary gears 1107, and a ring gear 1105. In the gearset 1115, the planetary gears 1107 are optionally arranged and configured to engage the ring gear 1105 at 1106, and the sun gear 1110 at 1109.

The drive module 1100 optionally includes a shifting assembly 1117 that, in this example, optionally includes a clutch 1102 and a brake 1116 that may be arranged and configured or otherwise operable to selectively couple the ring gear 1105 to either the carrier 1108 of the gearset or to a ground (such as housing 1101). In another aspect, the sun gear 1110 of the gearset 1115 is optionally coupled to an input shaft 1112. The carrier 1108 is optionally coupled to an output shaft 1113. Any suitable combination of clutches, brakes, synchronizers, and the like may be used in the shifting assembly 1117 to achieve this result.

In a first mode of operation, clutch 1102 is optionally configured to couple the carrier 1108 to the ring gear 1105. In this configuration, the clutch 1102 optionally forces the ring gear and the carrier to rotate together. In a second mode of operation, brake 1116 is optionally configured to couple the ring gear 1105 to ground, thus effectively locking the ring gear 1105 keeping it stationary with respect to other rotating elements of the gearset 1115. Preferably, drive module 1100 is configured such that clutch 1102 and brake 1116 are not engaged at the same time while torque is transferred to the input or output shafts.

According to this configuration, drive module 1100 provides two separate gear ratios as illustrated in Table 4 below:

TABLE 4

| | | Clutch 1102 | Brake 1116 |
|---|---|---|---|
| Gear | 1st | | X |
| | 2nd | X | |

In another aspect, a first gear is optionally defined when the ring gear 1105 is coupled to ground and clutch 1102 remains disengaged. The resulting first gear ratio of the two separate gear ratios may be of any suitable ratio such as less than or equal to 3:1, greater than 3:1, greater than 11:1, greater than 7:1, greater than 10:1, or more.

In another aspect, a second gear is optionally defined by coupling the ring gear 1105 to the carrier 1108. This is achievable by disengaging the brake 1116, and engaging the clutch 1102. This may provide a second gear of any suitable ratio such as less than or equal to 2:1, greater than 2:1, greater than 4:1, greater than 6:1, greater than 8:1, or more.

In another aspect, a neutral gear may be provided by disengaging both the clutch 1102 and the brake 1116. A wide range of gear ratios may be achieved based on the relative sizes and arrangement of the gears in the planetary gear set.

In another aspect, the drive module 1100 is optionally configured to provide an equal number of forward and reverse gears. A first and second reverse gear may be obtained by driving the motor coupled to the input shaft 1112 in reverse and actuating the clutch 1102 and the brake 1116 according to Table 4. The drive module 1100 thus optionally provides reverse gears with the same gear ratios as the forward gears but without the additional complexity of a reverser.

Figure 12:
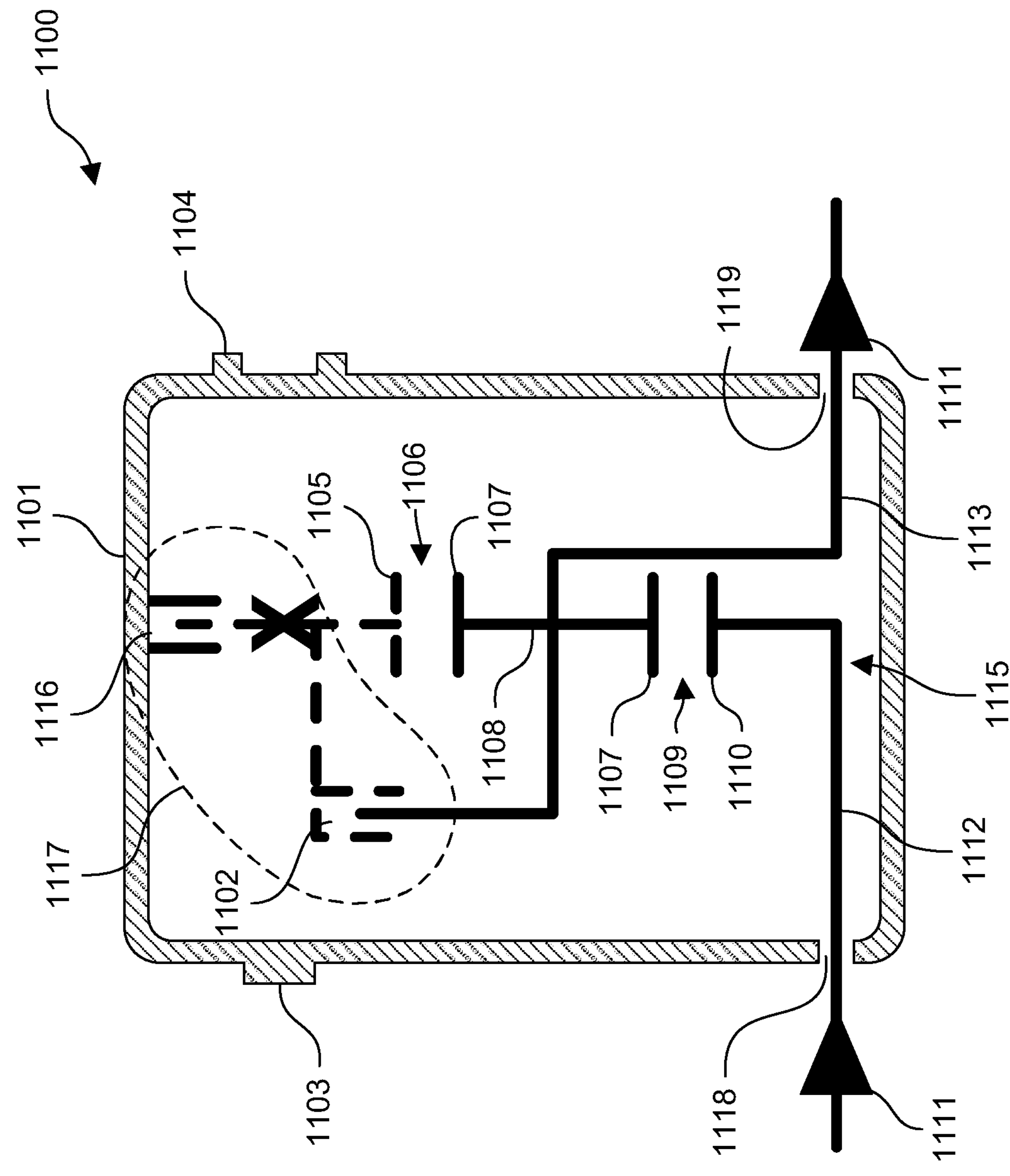
FIG. 12 is a diagram illustrating the example of FIG. 11 in operation.
Figure 13:
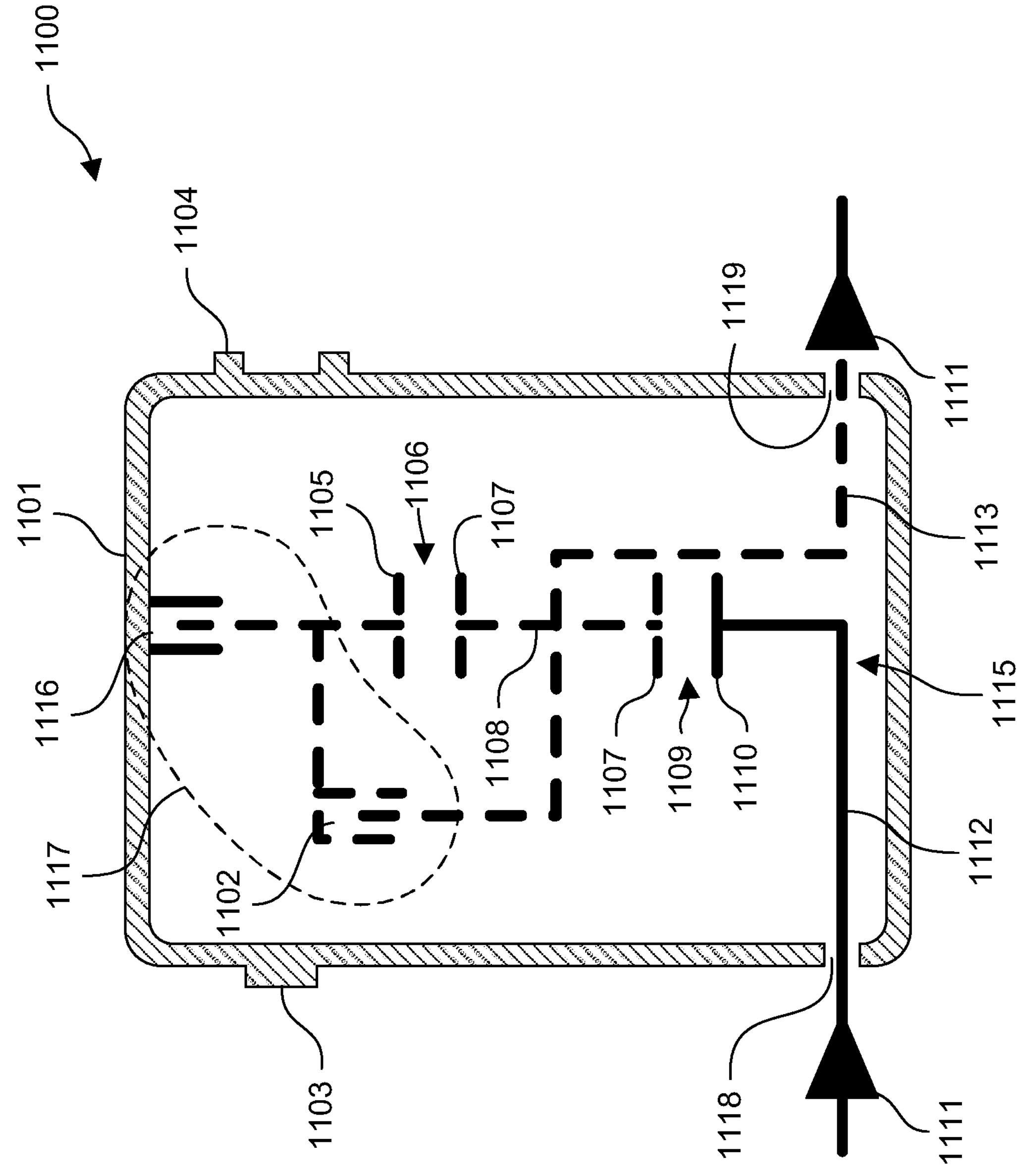
FIG. 13 is another diagram illustrating the example of FIG. 11 in operation.

The drive module of FIG. 11 is shown in operation in FIGS. 12 and 13. In these figures, like other similar figures included herein, parts indicated with similar dashed lines are constrained to rotate together, while parts in solid lines rotate independently or not at all. Parts marked with an "X" are constrained from rotating and are thus grounded.

In FIG. 12, the brake 1116 is engaged to ground the ring gear 1105 to the housing while clutch 1102 remains deactivated. This means that the ring gear 1105 is maintained in place and is not allowed to rotate relative to the housing 1101 of the drive module. The sun gear 1110 provides input torque to the gearset 1115, and the carrier 1108 and the planetary gears 1107 are thus allowed to rotate freely in relation to the ring gear 1105 and sun gear 1110. In this way power moves downstream through the drive module according to the arrows 1111 to provide a first gear ratio.

In FIG. 13, the clutch 1102 is actuated to couple the input shaft 1112 to the carrier 1105 and the sun gear 1110. In this configuration, the ring gear 1105 and the sun gear 1110 rotate together with the input shaft. Torque is transferred to the output shaft 1113 via the carrier 1108. In this way power transfers through the drive module and downstream via the output shaft 1113 to provide a second gear ratio.

Figure 14:
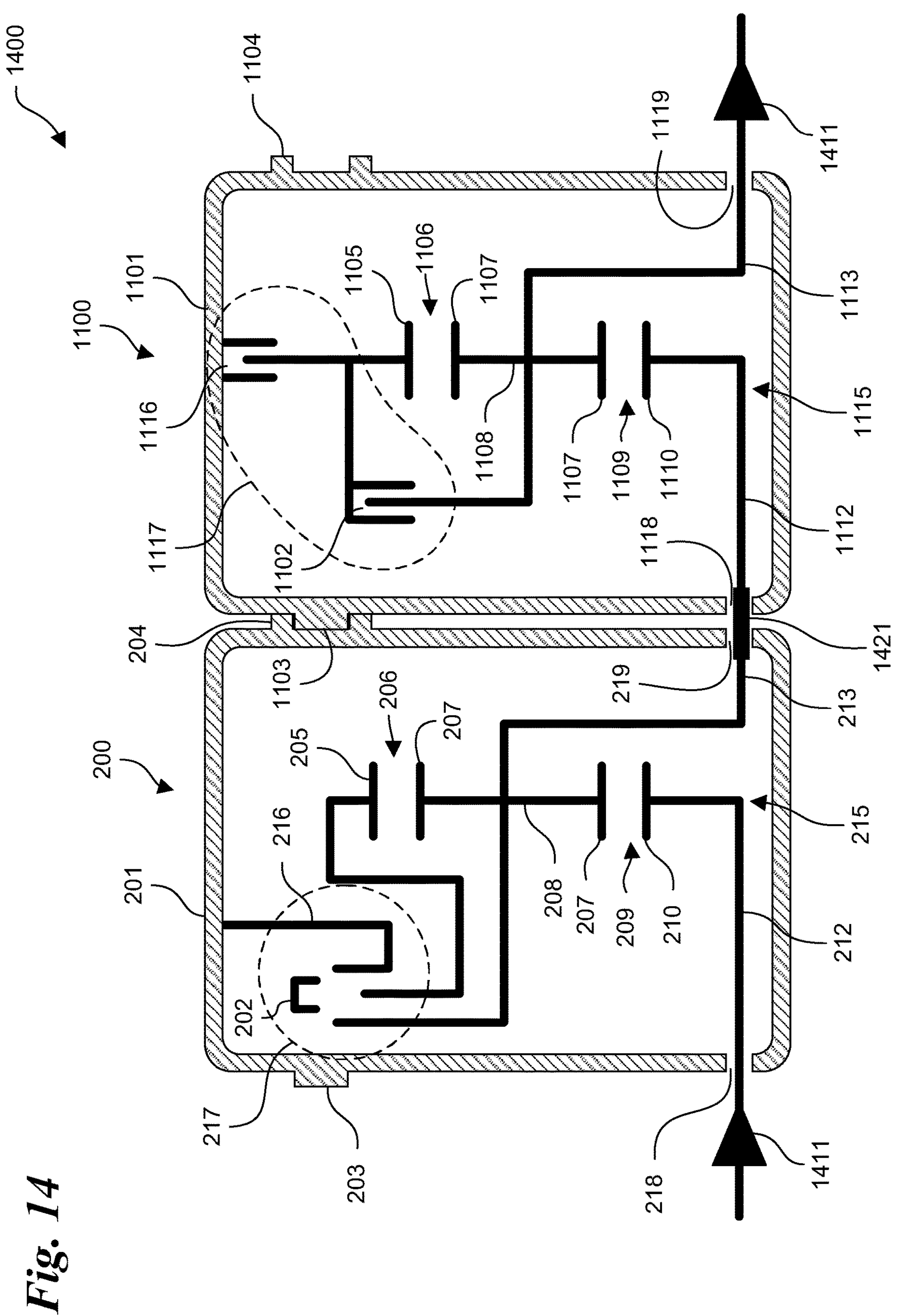
FIG. 14 is a diagram illustrating two different drive modules of the present disclosure coupled together.

Illustrated in FIG. 14 is one example of a drive train 1400 comprising multiple different drive modules of the present disclosure. In this example the drive module shown in FIG. 2 and discussed above is coupled to the drive module illustrated in FIG. 11. Both are arranged and configured according to the present disclosure to provide four forward, and four reverse gears. Power flows through the drivetrain 1400 as indicated by the arrows 1411. As discussed herein elsewhere, power flow can be reversed, such as in the case of regenerative braking where torque is applied to the output shaft 1113 and power flows upstream into the motor. In another aspect, the reverse gears may be achieved by reversing the rotation of the motor coupled to the drivetrain. A coupler 1421 couples the output shaft 213 of the drive module 200 with the input shaft 1112 of the drive module 1100 to created drivetrain with $2^N$ available gears where N is the number of drive modules in the drivetrain (in this case N equals two). The shifting assemblies 217 and 1117 may be actuated as indicated below in Table 5 to achieve four different gear ratios:

TABLE 5

| | | Synchronizer 202 | | Clutch | Brake |
|---|---|---|---|---|---|
| | | 1st Mode | 2nd Mode | 1102 | 1116 |
| Gear | 1st | | X | | X |
| | 2nd | X | | | X |
| | 3rd | | X | X | |
| | 4th | X | | X | |

In another example, the modules 201 and 1117 may be reversed in the drivetrain with the drive module 200 being downstream of drive module 1100. In that instance, the shifting assemblies 217 and 1117 may be actuated as indicated below in Table 6 to achieve four different gear ratios:

TABLE 6

| | | Clutch | Brake | Synchronizer 202 | |
|---|---|---|---|---|---|
| | | 1102 | 1116 | 1st Mode | 2nd Mode |
| Gear | 1st | | X | | X |
| | 2nd | X | | | X |
| | 3rd | | X | X | |
| | 4th | X | | X | |

FIG. 14 also illustrates an example of multiple drive modules of the present disclosure coupled together irrespective of whether any one of the modules uses synchronizer, clutches, brakes, or other suitable methods of shifting between gears. As illustrated throughout the present disclosure, the disclosed drive modules, and any others like them, may be interchangeable with one another in a transmission or drive system. This architecture allows the construction and modification of many different transmission designs that can be quickly and easily created based on the requirements of the vehicle, the power profile of the motor, and other factors. The specific torque limits, gear ratios, and other details about each drive module can be tailored according to specific needs, and the resulting modules may be added, replaced, moved upstream or downstream of other modules, and so forth, with minimal effort.

In another aspect, the drive modules may be placed upstream of a motor, downstream of a motor, some on an upstream side, and some on a downstream side, etc. Additional intermediary shafts configured to couple the input and output shafts of the upstream and downstream drive modules may be useful for bridging gaps between the drive modules when the motor or other drivetrain components are positioned midstream between two modules.

In another aspect, multiple drive modules with separate independent housings may be positioned within a transmission having its own housing. For example, a transmission housing may be arranged and configured such that multiple independent drive modules may be interchangeably positioned within the housing with minimal required set up time. In one aspect, the transmission housing may be arranged and configured to accept drive modules by inserting them into the housing such that the mount points of the different modules hold the modules in place relative to each other, and optionally the transmission housing may define a cavity shaped to maintain the drive modules in place relative to the housing. Thus multiple drive modules may be quickly and easily slid into position in the housing and locked in place. In this way, a single transmission housing design may be used for a wide variety of different drivetrains having various different gear ratios, numbers of gears, torque input and output profiles, and the like.

Figure 15:
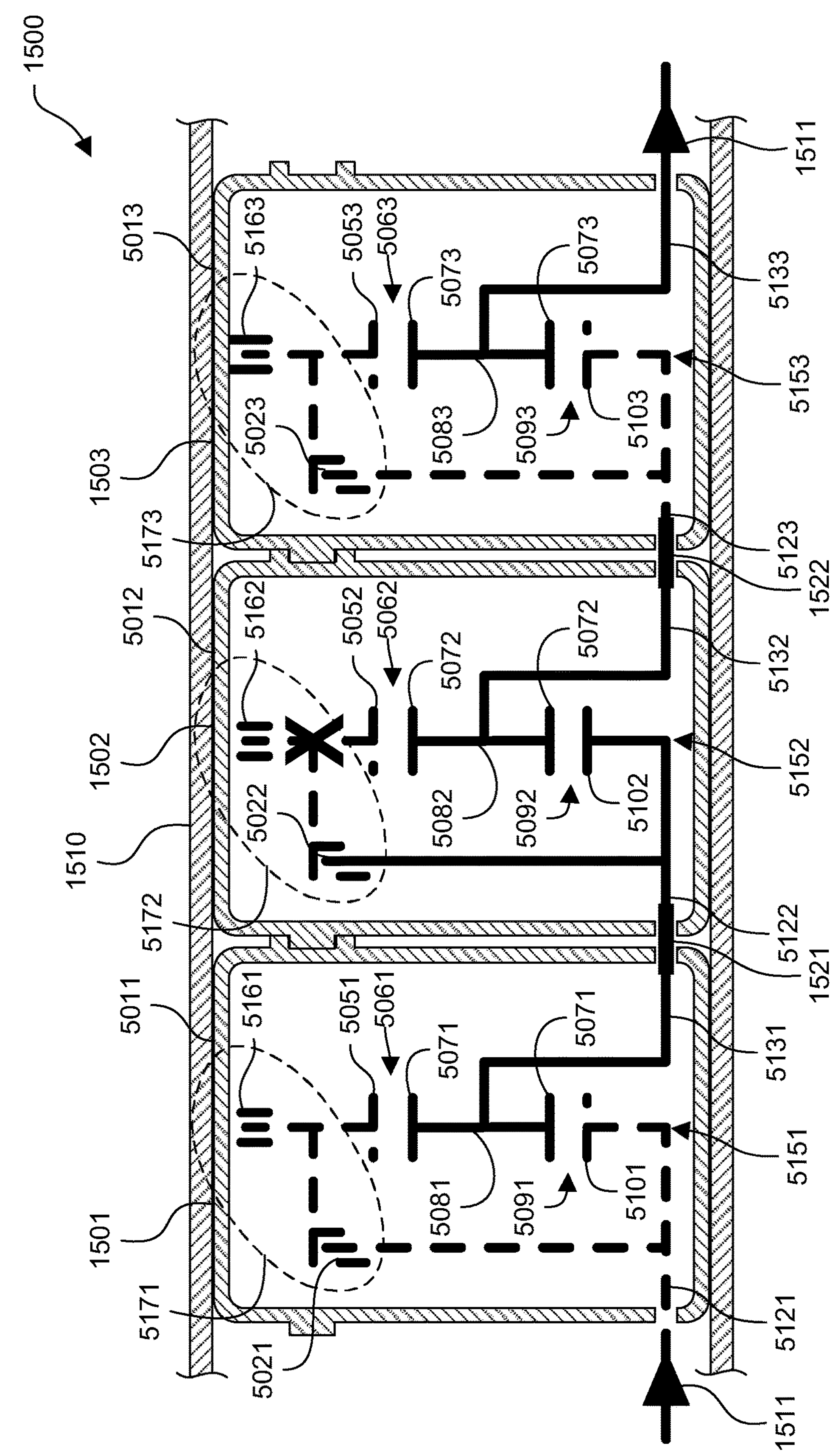
FIG. 15 is a diagram illustrating three identical drive modules of the present disclosure operating together in a transmission configured to provide eight different gear ratios.

In one example shown at 1500 in FIG. 15, a drive system according to the present disclosure includes three individual drive units. In this instance, the drive modules are identical in configuration, although they may vary in other aspects such as gear ratios, size, materials, and the like. The drive modules are coupled together and optionally positioned within a housing 1510 that at least partially encloses the modules.

Any drive module of the present disclosure may be included in the configuration shown at 1500. In this specific example, three independent drive modules 1501-1503 are included, each optionally configured to provide two different gear ratios as discussed above. Each of the three drive modules 1501-1503 are configured as shown in FIG. 5, and the individual parts from FIGS. 5, 6, and 7 are reproduced here with a 1, 2, or 3 suffix corresponding to each the same parts in the separate modules 1501, 1502, and 1503. The individual modules are linked together by a coupler 1521 configured to lock the output shaft 5131 and the input shaft 5122 together, and by a second coupler 1522 configured to lock the output shaft 5132 and the input shaft 5123 together. In this way torque is transferred from one module to the next in the direction shown at 1511 (or optionally in the reverse direction as discussed above with respect to reverse power flows such as in the case of a regenerative braking episode).

FIG. 15 further illustrates the drivetrain in operation. Modules 1501 and 1503 are shown in operation according to the example given in FIG. 7, while module 1502 is shown in operation according to the example given in FIG. 6. These are offered here simply as examples as any suitable drive module according to the present disclosure may be used as shown along with, or in place of the three modules illustrated here.

When coupled together, the three drive units 1501-1503 are operable as disclosed in FIGS. 6 and 7 to provide a total of eight gears according to Table 7 below:

TABLE 7

| | | Module 1501 | | Module 1502 | | Module 1503 | |
|---|---|---|---|---|---|---|---|
| | | Clutch 5021 | Brake 5161 | Clutch 5022 | Brake 5162 | Clutch 5023 | Brake 5163 |
| Gear | 1st | | X | | X | | X |
| | 2nd | X | | | X | | X |
| | 3rd | | X | X | | | X |
| | 4th | X | | X | | | X |
| | 5th | | X | | X | X | |
| | 6th | X | | | X | X | |
| | 7th | | X | X | | X | |
| | 8th | X | | X | | X | |

In this example, the drive system 1500 includes three separate shifting assemblies 5171, 5172, and 5173 which are presently configured in FIG. 15 to provide a sixth gear ratio of the eight possible forward and reverse ratios: Brake 5163 is disengaged, clutch 5023 is engaged (as illustrated in the furthest downstream module 1503), brake 5162 is engaged, clutch 5022 is disengaged (as illustrated in the center module 1502), brake 5161 is disengaged, and clutch 5021 is engaged (as illustrated in the furthest upstream module 1501). As discussed above, the gear ratio shown may be provided in either the forward or reverse direction depending on the rotational direction of the input shaft 5121 caused by the motor, or the output shaft 5133 caused by upstream torque from the drivetrain (as in the example of regenerative braking).

Figure 16:
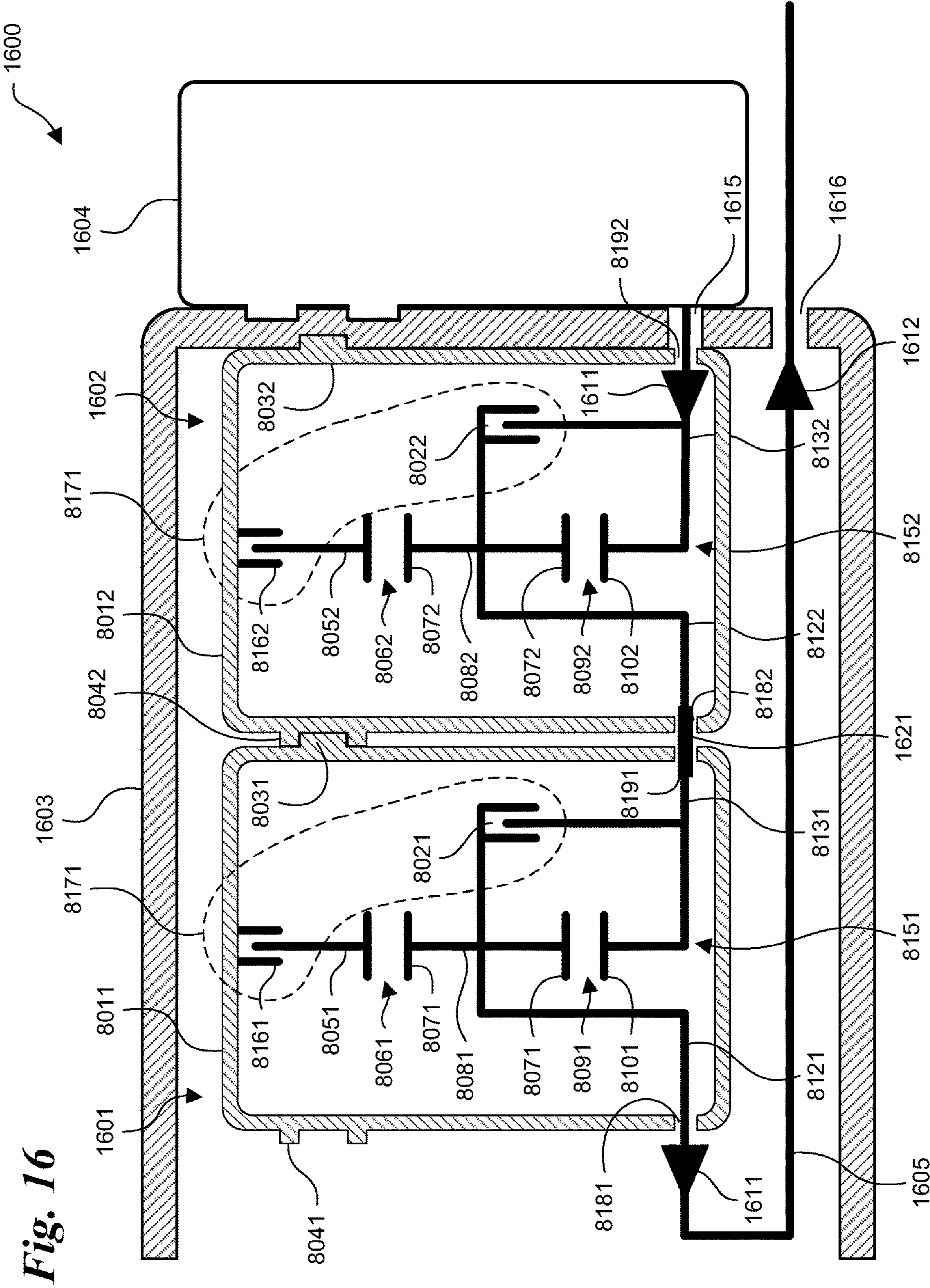
FIG. 16 is a diagram illustrating one example of the disclosed drive modules coupled upstream of an electric motor.

FIG. 16 illustrates at 1600 another example of a drivetrain 1600 that includes multiple individual modules 1601 and 1602 mounted in a housing 1603. In one aspect, the drive module 1601 and 1602 are mounted upstream of an electric motor generator 1604. The motor 1604 is optionally mounted outside the housing 1603 and is arranged and configured to provide power to the first upstream module 1602 via input shaft 8132 passing through an opening 1615 in the housing.

In this example, the independent drive modules are disclosed in detail herein elsewhere and illustrated in FIGS. 8, 9, and 10. The part numbers from FIG. 8 are reproduced here in both drive modules 1601 and 1602 with the addition of a suffix 1 for the furthest upstream module 1601, and the suffix 2 for the other module shown, 1602. This numbering is provided to easily distinguish between the components shown in the separate but similar drive modules illustrated in FIG. 16.

A coupling element 1621 couples the output shaft 8122 of the first upstream module to the input shaft 8131 of the second upstream module. In another aspect, power flows upstream (in the forward direction) as illustrated at 1611 through the first and second modules before reversing direction and passing downstream as shown at 1612 through an output shaft 1605. The output shaft 1605 optionally exits through the housing 1603 at an opening 1616 to engage other aspects of the drivetrain. In another aspect, the openings 1615 and 1616 are illustrated as separate and distinct, however, such a configuration is only offered as an illustration. Multiple physical openings for the input and output shafts is one optional arrangement, but it is not required. For example, input shaft 8132 and output shaft 1605 may be counter rotating shafts passing through a single opening such as in the case where one shaft is configured to pass through the other and thus both are configured to pass through the same opening in the housing 1603.

As discussed herein throughout, any suitable drive modules may be included in the configuration illustrated in FIG. 16. The drive modules may be advantageously arranged in the housing 1603 which at least partially surrounds the drive modules 1601 and 1602 so that multiple different drive modules may be used together. In this particular example, two of the same drive modules may be used together, however, any suitable number or type of independent drive modules may be included to provide a drivetrain where one or more independent drive modules are mounted upstream of the motor.

Figure 17:
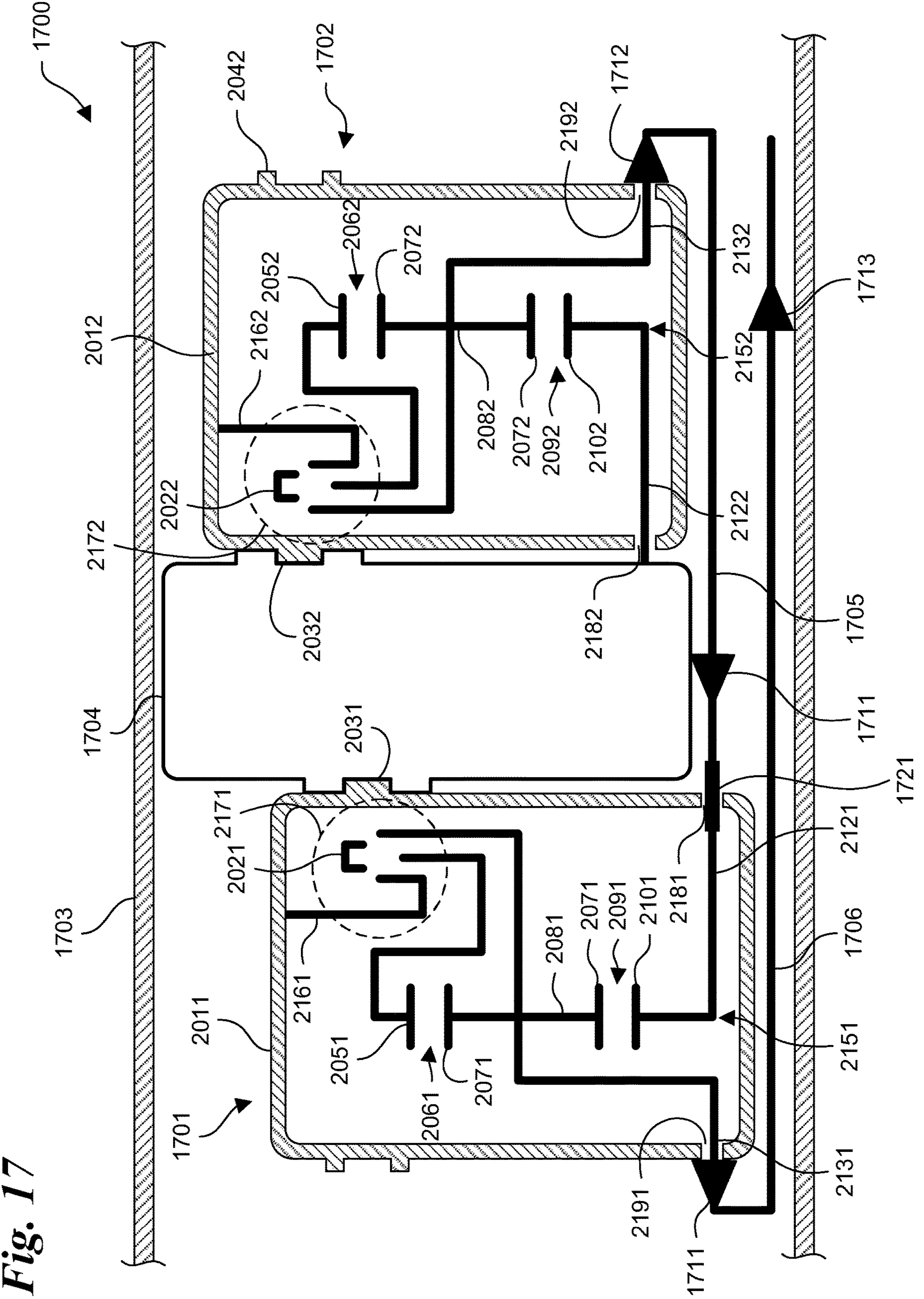
FIG. 17 is a diagram illustrating one example of the disclosed drive modules coupled upstream and downstream of an electric motor.

In FIG. 17 is illustrated yet another example of a configuration of drive modules. A transmission 1700 is illustrated with two separate and independent similar drive modules 1701 and 1702. The independent drive modules are arranged and configured as disclosed herein elsewhere and illustrated in FIGS. 2, 3, and 4. A housing 1703 at least partially encloses the drivetrain 1700 and may be useful to provide structural support to the one or more independent modules, and optionally to the motor. In one aspect, the motor may be optionally mounted in the housing 1703 as part of the transmission 1700. In this example, power from an electric motor generator 1704 travels first through a downstream module 1702 in the direction illustrated at 1712, then upstream via an optional intermediary shaft 1705 in the direction illustrated at 1711. Intermediary shaft 1705 is optionally coupled to the input shaft 2121 via a coupler 1721. Power passes through the second individual power module 1701 in the upstream direction as shown at 1711, before reversing direction to travel downstream in the direction illustrated at 1713 via an output shaft 1706.

As illustrated in FIG. 17, any of the disclosed drive modules may be mounted upstream of the motor, downstream of the motor, or any combination thereof. In this particular example, both modules are similar, but as disclosed herein throughout, the modules are generally interchangeable and thus any combination of two, three, or more modules may be arranged with a motor mounted between any two of them.

Figure 18:
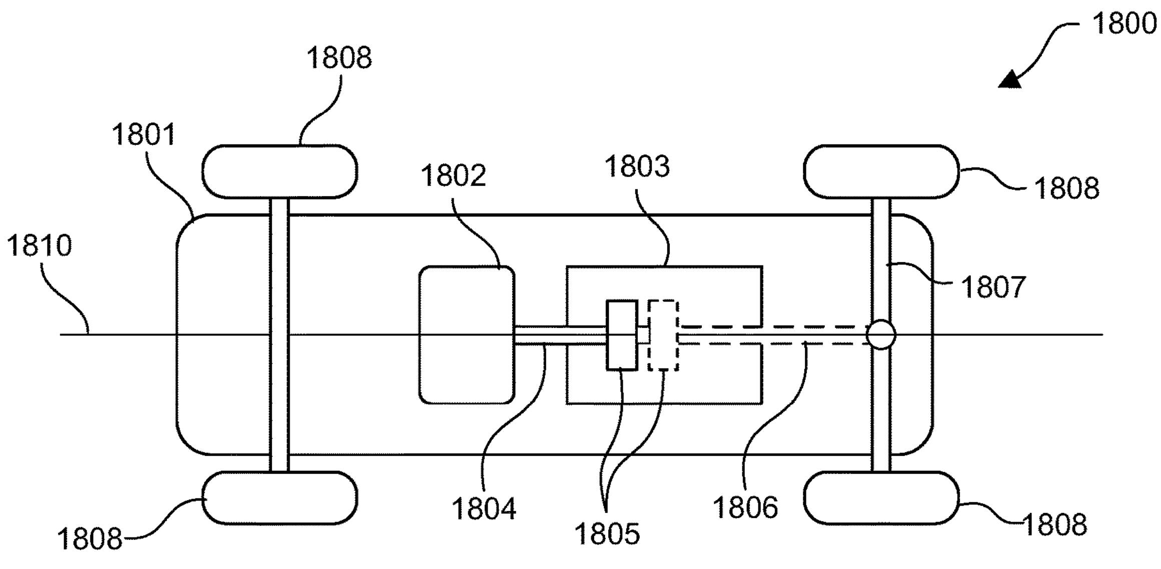
FIG. 18 is a diagram illustrating another example of the components and configuration of a drive system of the present disclosure.

FIGS. 18-27 illustrate a number of different configurations for a drive system or drivetrain of the present disclosure mounted in a vehicle. In FIG. 18 at 1800, a vehicle 1801 is shown that optionally includes an electric motor 1802 which may be arranged and configured to provide torque to a transmission 1803 via an input shaft 1804. The transmission may include an arrangement of one or more individual drive modules 1805. The drive modules 1805 are optionally configured according to any of the examples discussed in the present disclosure to provide multiple different forward and reverse gear ratios. An output shaft 1806 of the transmission may be coupled to the drive modules 1805 according to the present disclosure to optionally provide power to a drive axle 1807. One or more earth engaging members 1808 may be included and may be coupled to the output shaft 1806. These earth engaging members may include, for example, tires, wheels, belts, tracks, and the like, or any combination thereof.

In another aspect, the drive system may be arranged and configured with motor 1802, transmission 1803, and output shaft 1806 aligned axially on a common axis 1810. This common axis 1810 may optionally be perpendicular to the drive axle 1807. In another aspect, the input shaft 1804 receiving power from the electric motor 1802 may extend outwardly toward the motor 1802 in a different direction from the output shaft 1806 which may extend outwardly away from the transmission and toward the drive axle. For example, the input shaft 1804 and the output shaft 1806 may extend out from the transmission 1803 in opposite directions.

In another aspect, the transmission 1803 and drive modules 1805 may be mounted downstream of the motor. Power optionally flows downstream from the motor 1802 through the input shaft and into the transmission 1803 where it may then transfer through the drive modules 1805 and to the output shaft 1806. Power may then continue through the output shaft 1806 downstream to the drive axle 1807, and eventually to the earth engaging members 1808.

Figure 19:
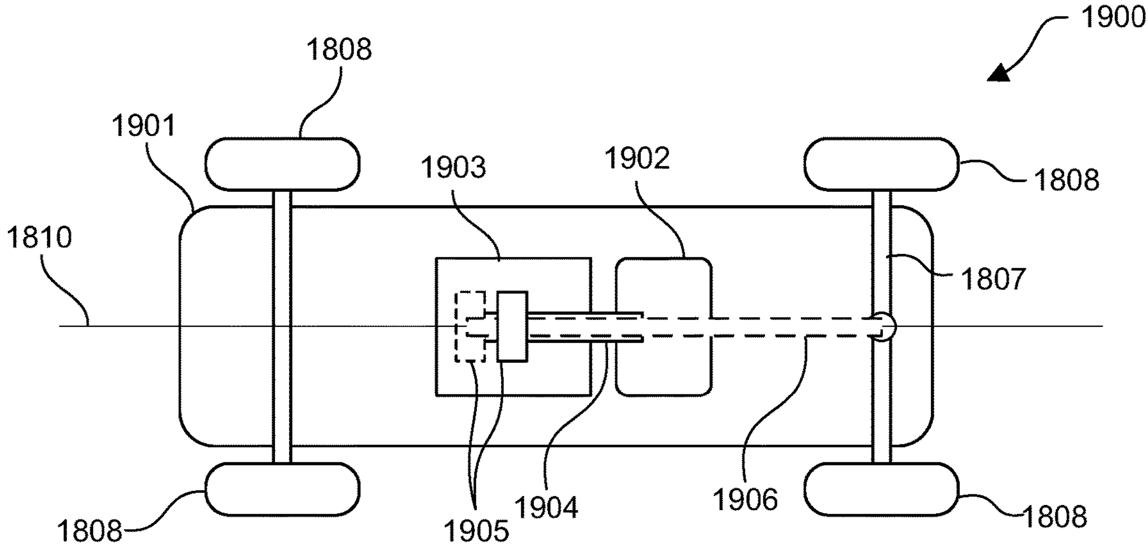
FIG. 19 is a diagram illustrating another example of the components and configuration of a drive system of the present disclosure.

FIG. 19 illustrates at 1900, another example of a vehicle 1901 that is like the vehicles of the preceding figures but with a different drive train arrangement. Vehicle 1901 optionally includes an electric motor 1902 which may be arranged and configured to provide torque to a transmission 1903 via an input shaft 1904. The four speed transmission may include an arrangement of one or more planetary drive modules 1905. The drive modules 1905 are optionally configured according to the present disclosure to provide any suitable forward and reverse gear ratios according to the number of modules and the configuration of gears in each module. An output shaft 1906 of the transmission may be coupled to the drive modules 1905 according to the present disclosure to optionally provide power to a drive axle 1807. One or more earth engaging members 1808 may be included and may be coupled to the output shaft 1806.

In another aspect, the drive system may be arranged and configured so that motor 1902, the transmission 1903, and the output shaft 1906 are aligned axially on a common axis 1910. This common axis 1910 may optionally be perpendicular to the drive axle 1807. In another aspect, the input shaft receiving power from the electric motor 1802 may extend outwardly toward the motor 1902 in the same direction as the output shaft 1906 which may extend outwardly away from the transmission and toward the drive axle. For example, the output shaft 1906 optionally passes through the input shaft 1904 and the electric motor 1902 to engage with the drive axle 1807. In another aspect, the input shaft 1904 may optionally pass through the output shaft 1906 to engage the drive axle 1807.

In another aspect, the transmission 1903 and drive modules 1905 may be mounted upstream of the motor 1902. Power optionally flows from the motor 1902 upstream through the input shaft and into the transmission 1903 where it may then transfer through the drive modules 1905 and to the output shaft 1906. Power may then flow downstream through the output shaft 1906 back through the motor 1902, and to drive axle 1807. The output shaft 1906 thus extends from the transmission 1903 to engage the drive axle 1807, and passes through a central cavity defined by the motor 1902.

Figure 20:
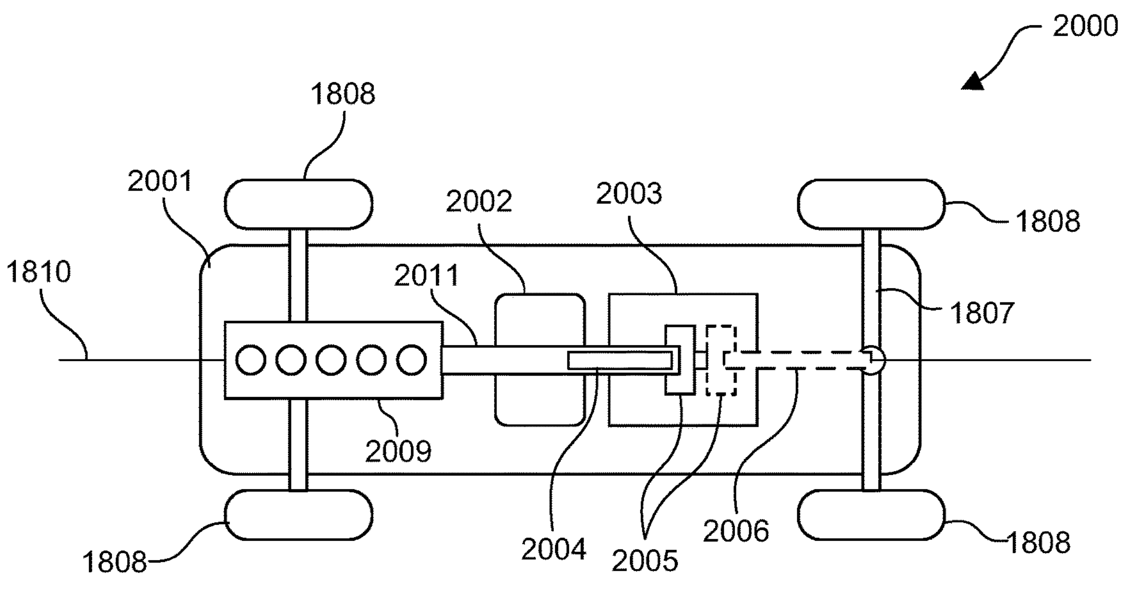
FIG. 20 is a diagram illustrating another example of the components and configuration of a drive system of the present disclosure.

In FIG. 20 at 2000, a vehicle 2001 is shown that is like the vehicles of the preceding figures. Vehicle 2001 optionally includes an electric motor 2002 which may be arranged and configured to provide torque to a transmission 2003 via an input shaft 2004. Vehicle 2001 also includes an internal combustion engine 2009 which is arranged and configured to provide power to the transmission 2003 via a second input shaft 2011. In this configuration, motor 2002 and engine 2009 comprise a hybrid vehicle drive system that uses a modular transmission 2003 of the present disclosure.

The modular transmission 2003 includes one or more drive modules 2005 that are optionally configured according to the present disclosure to provide any suitable number of gear ratios depending on the number of modules 2005 included, and the specific gear ratios of each module. An output shaft 2006 of the transmission may be coupled to the drive modules 2005 according to the present disclosure to optionally provide power to a drive axle 1807. The power delivered by the transmission 2003 may include power provided by the internal combustion engine 2009, the electric motor 2002, or any combination thereof. One or more earth engaging members 1808 may be included and may be coupled to the output shaft 2006.

In another aspect, the drive system may be arranged and configured so that motor 2002, the transmission 2003, and the output shaft 2006 are aligned axially on a common axis 1810. This common axis 1810 may optionally be perpendicular to the drive axle 1807. In another aspect, at least a portion of the input shaft 2004 may be positioned within or adjacent to the input shaft 2011, and these two shafts may be aligned axially on the common axis 1810. In another aspect, the input shaft 2004 receiving power from the electric motor 2002, and/or the input shaft 2011 receiving power from the engine 2009, may extend outwardly from the transmission 2003 in a different direction from the output shaft 2006. The output shaft 2006 may, for example, extend outwardly away from the transmission and toward the drive axle 1807 from a side of the transmission 2003 that is opposite the shafts 2004 and 2011.

In another aspect, the transmission 2003 and drive modules 2005 may be mounted downstream of the motor. Power optionally flows from the motor 2002 through the input shaft 2004, and/or from engine 2009 through input shaft 2011, and into the transmission 2003 where it may then transfer through the drive modules 2005 and to the output shaft 2006. Power may then continue through the output shaft 2006 downstream to the drive axle 1807, and eventually to the earth engaging members 1808.

Figure 21:
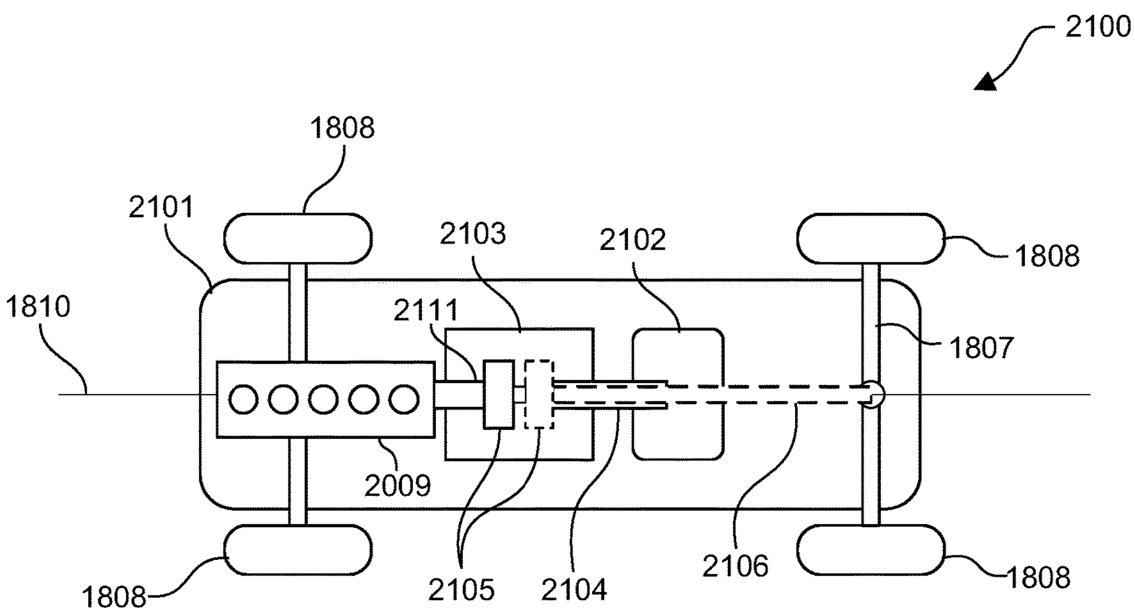
FIG. 21 is a diagram illustrating another example of the components and configuration of a drive system of the present disclosure.

In FIG. 21 at 2100, a vehicle 2101 is shown that is like the vehicles illustrated in the preceding figures. Vehicle 2101 optionally includes an electric motor 2102 which may be arranged and configured to provide torque to a transmission 2103 via an input shaft 2104. Vehicle 2101 also includes an internal combustion engine 2009 which is arranged and configured to provide power to the transmission 2103 via a second input shaft 2111. In this configuration, motor 2102 and engine 2009 comprise a hybrid vehicle drive system that uses a transmission 2103 of the present disclosure.

The transmission 2103 may include any suitable arrangement of one or more drive modules 2105. The drive modules 2105 are optionally configured according to the present disclosure to provide multiple forward and reverse gear ratios depending on the number of modules used, and the gear ratios implemented by each module. An output shaft 2106 of the transmission may be coupled to the drive modules 2105 according to the present disclosure to optionally provide power to a drive axle 1807. The power delivered by the transmission 2103 may include power provided by the internal combustion engine 2009, the electric motor 2102, or any combination thereof. One or more earth engaging members 1808 may be included and may be coupled to the output shaft 2106.

In another aspect, the drive system may be arranged and configured so that motor 2002, the transmission 2003, and the output shaft 2006 are aligned axially on a common axis 1810. This common axis 1810 may optionally be perpendicular to the drive axle 1807. In another aspect, the input shaft 2104 receiving power from the electric motor 2102 may enter transmission 2103 from a side opposite the input shaft 2111, both of which optionally extend outwardly from the transmission 2103. A portion of the output shaft 2106 may be positioned within the input shaft 2104. The output shaft 2106 may, for example, extend outwardly away from the transmission and toward the drive axle 1807 from a side of transmission 2003 that is opposite 2111.

In another aspect, the transmission 2103 and drive modules 2105 may be mounted upstream of the motor 2102, and optionally downstream from the engine 2009. Power optionally flows from the motor 2102 upstream through the input shaft 2104 and into the transmission 2103 where it may then transfer through the drive modules 2105 and to the output shaft 2106. Power may then flow downstream through the output shaft 2106 back through the motor 2102, and to drive axle 1807. In another aspect, power may flow downstream from engine 2009 via input shaft 2111 to engage the drive modules 2105. Power may then continue downstream to the drive axle 1807 via the output shaft 2106. The output shaft 2106 thus extends from the transmission 2103 to engage the drive axle 1807, and optionally passes through a central cavity defined by the motor 2102.

Figure 22:
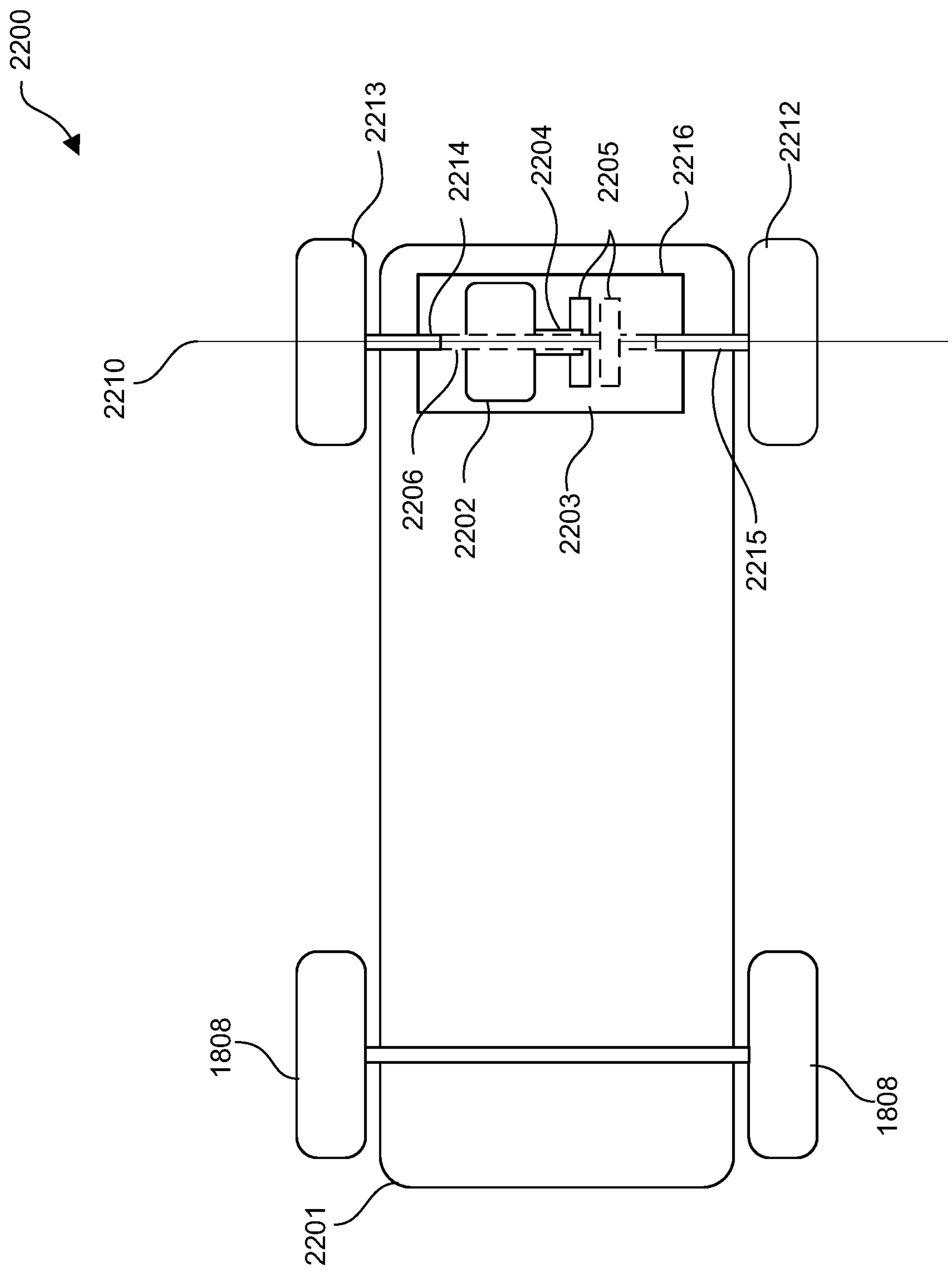
FIG. 22 is a diagram illustrating another example of the components and configuration of a drive system of the present disclosure.

FIG. 22 illustrates at 2200, another example of a vehicle 2201 that is like the vehicles of the preceding figures but with a different drive train arrangement. Vehicle 2201 optionally includes an electric motor 2202 which may be arranged and configured to provide torque to a transmission 2203 via an input shaft 2204. An output shaft 2206 may be included to carry power from the transmission 2203 to one or more drive axles 2214 and 2215. The transmission 2203 may include any suitable arrangement of one or more drive modules 2205. The drive modules 2205 are optionally configured according to the present disclosure to provide any suitable number of forward and reverse gear ratios as discussed herein. A drive axle 2214 may be configured to receive power from the output shaft 2206 and may be coupled to the drive modules 2205 according to the present disclosure to optionally provide power to an earth engaging member 2213. A drive axle 2215 may be configured to receive power from the output shaft 2206 and may be coupled to the drive modules 2205 according to the present disclosure to optionally provide power to another separate earth engaging member 2212. In another aspect, 2206 may be a split shaft with separate portions engaging the drive axles 2214 and 2215.

In another aspect, the drive system may be arranged and configured so that the electric motor 2202, the transmission 2203, and the drive axles 2214 and 2215 are optionally aligned axially on a common axis 2210. In another aspect, the drive axles 2214 and 2215 optionally pass through a housing of the transmission 2203 and engage the drive modules 2205 via output shaft 2206. In another aspect, the motor 2202 and the transmission 2203 are optionally mounted axially on a common axis 2210 that is parallel to the drive axles 2214, 2215. In another aspect, at least two earth engaging members 2212 and 2213 are optionally mounted to the drive axle 2215 and 2214 respectively, and the motor 2202 and transmission 2203 are optionally mounted between the earth engaging members. The motor 2202 and the drive modules 2205 may optionally be mounted within a common housing of transmission 2203. In another aspect, the drive axles 2214 and 2215 are positioned to engage the output shaft 2206, and the output shaft is optionally arranged to pass through the input shaft 2204 and an opening or central cavity defined by the electric motor 2202 to provide torque to earth engaging members 2212 and 2213.

In another aspect, the transmission 2203 and drive modules 2205 may be mounted upstream of the motor 2202 with respect to a right earth engaging element 2213. Power optionally flows from the motor 2202 upstream through the input shaft and into the transmission 2203 where it may then transfer through the drive modules 2205 and to the drive axle 2214. Power may then flow downstream through the drive axle 2214 to the right earth engaging element 2213.

In another aspect, the transmission 2203 and drive modules 2205 may be mounted downstream of the motor 2202 with respect to a left earth engaging element 2212. Power optionally flows from the motor 2202 downstream to the transmission 2203 where it may then transfer through the drive modules 2205 and to the drive axle 2215. Power may then flow downstream through the drive axle 2215 to the left earth engaging member 2212. The drive axle 2214 thus optionally extends from the transmission 2203 without passing through a central cavity defined by the motor 2202.

Figure 23:
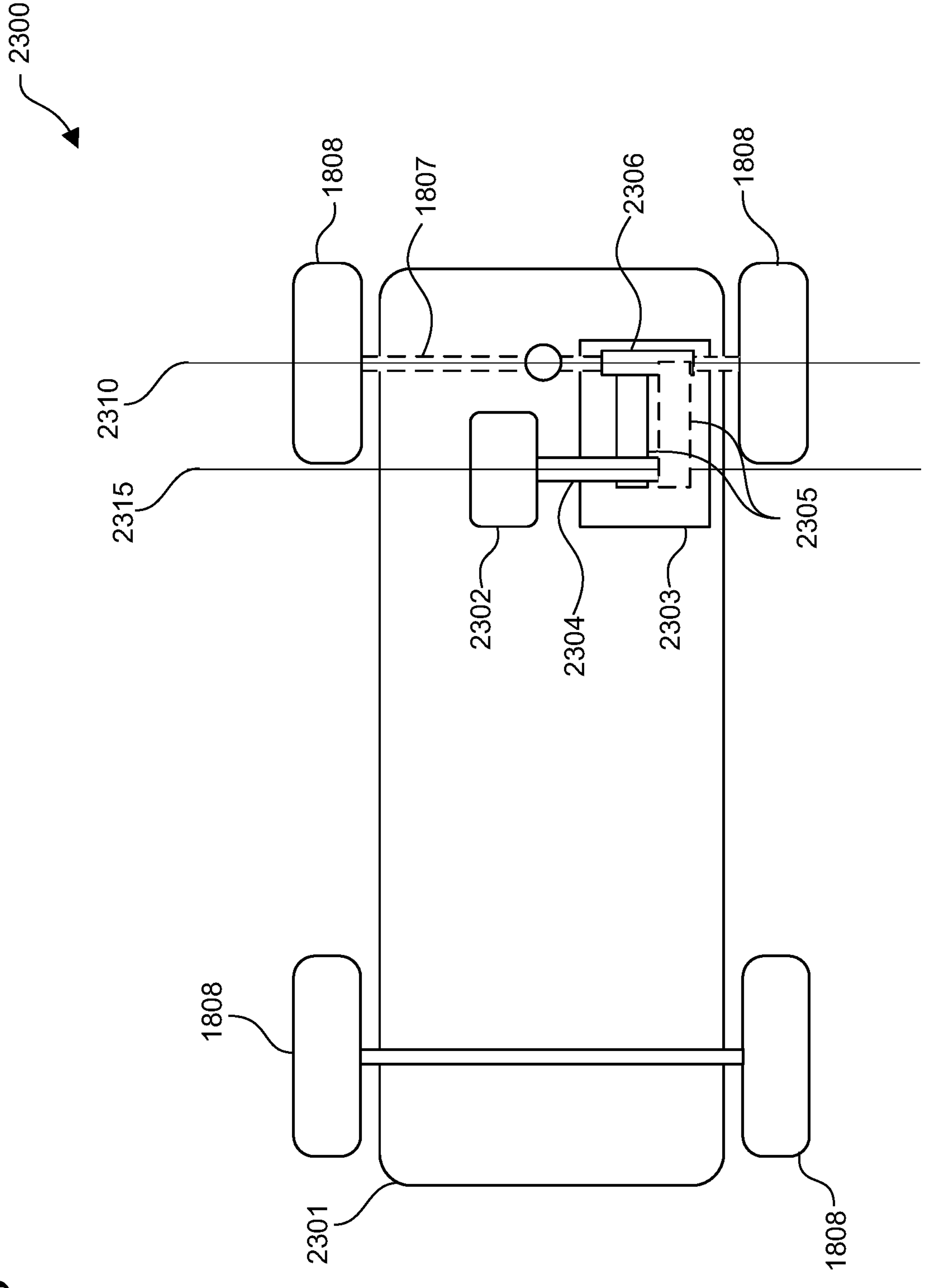
FIG. 23 is a diagram illustrating another example of the components and configuration of a drive system of the present disclosure.

FIG. 23 illustrates at 2300, another example of a vehicle 2301 that is like the vehicles of the preceding figures but with yet another different drive train arrangement. Vehicle 2301 optionally includes an electric motor 2302 which may be arranged and configured to provide torque to a modular transmission 2303 via an input shaft 2304. The modular transmission may include an arrangement of one or more drive modules 2305. The drive modules 2305 are optionally configured according to the present disclosure to provide multiple different gear ratios according to the configuration of the drive modules included. Any suitable drive module of the present disclosure may be used. A drive axle 1807 may be configured to receive power directly from the transmission 2303 via output shaft 2306. The output shaft 2306 may be coupled to the drive modules 2305 according to the present disclosure to optionally provide power to one or more earth engaging members 1808.

In another aspect, the drive system may be arranged and configured so that the electric motor 2302, the transmission 2303, and drive axle 1807 may be optionally aligned axially on the same axis of rotation 2310. In another aspect, the drive axle 1807 optionally passes through a housing of the transmission 2303 engaging the drive modules 2305 by either a single shaft, or multiple shaft portions, extending outwardly in opposite directions away from transmission 2303.

In another aspect, the electric motor 2302 and the input shaft 2304 may optionally be aligned on a separate axis 2315 that may be parallel to axis 2310. The input shaft 2304 may be parallel to the drive axle 1807 but offset from the drive axle 1807. The motor 2302 and transmission 2303 are thus optionally mounted axially on a common axis 2315 that is parallel to the drive axle 1807. Drive modules 2305 may be configured to engage both the input shaft 2304 and the output shaft 2306. The output shaft 2306 engages the drive axle 1807 which may be a single shaft, or multiple shaft portions, extending outwardly in opposite directions away from transmission 2303. A transmission housing of transmission 2303 is configured to retain the transmission including drive modules 2305 while the drive axle 1807 extends away from the transmission housing to engage at least two earth engaging members 1808 such that the input shaft 2304 and the drive axle 1807 rotate on separate axes of rotation 2315 and 2310 that are parallel.

In another aspect, the transmission 2303 and drive modules 2305 may be mounted downstream of the motor 2302. Power optionally flows from the motor 2302 downstream to the transmission 2303 where it may then transfer through the drive modules 2305 and to the drive axle 1807. The drive axle 1807 thus optionally extends from the transmission 2303 without passing through the central cavity defined by the motor 2302. In another aspect, the drive axle 1807 passes through a housing of the transmission 2303 to engage the planetary drive modules 2305 within the housing of the transmission.

Figure 24:
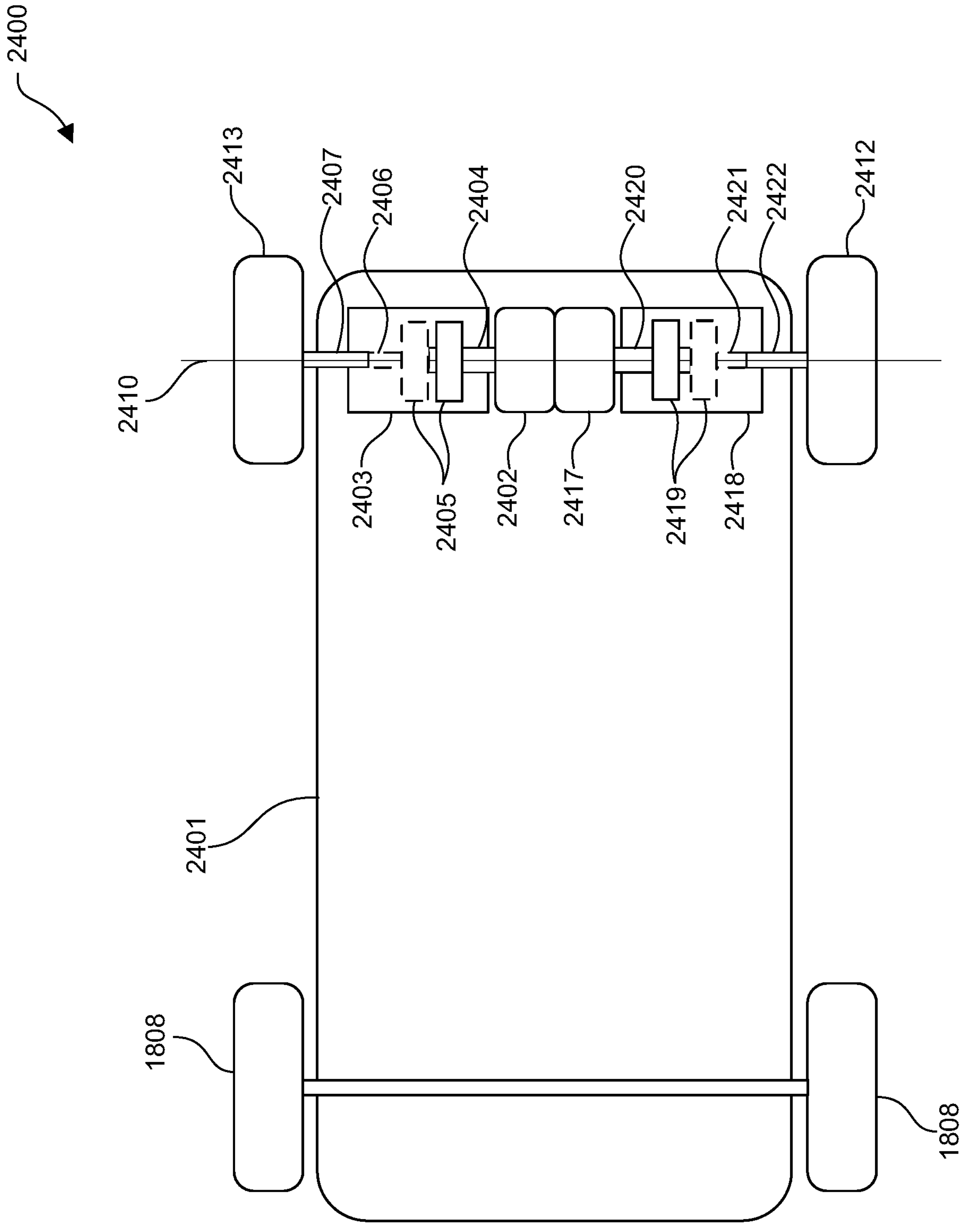
FIG. 24 is a diagram illustrating another example of the components and configuration of a drive system of the present disclosure.

FIG. 24 illustrates at 2400, another example of a vehicle 2401 that is like other vehicles of the preceding figures, but with another different drive train arrangement. Vehicle 2401 optionally includes a first electric motor 2402, and a second electric motor 2417 arranged and configured to provide torque separately to a first transmission 2403 and a second transmission 2418 via a first input shaft 2404 and a second input shaft 2420. The first electric motor 2402 is optionally coupled to the first transmission 2403, and the second electric motor 2417 is optionally coupled to the second transmission 2418.

In this example, the first and/or the second transmissions 2403 and 2418 optionally include multiple independent drive modules 2405 and 2419 of the present disclosure. Drive modules 2405 and 2419 may be any suitable module according to the present disclosure, and the combination of modules may provide any suitable number of gears and gear ratios according to the drive modules 2405 and 2419 included in each transmission.

A first output shaft 2406 may be coupled to drive axle 2407. The drive axle 2407 is optionally coupled to a first earth engaging member 2413. A second output shaft 2421 of the second transmission 2418 is optionally coupled to a second drive axle 2422. The second drive axle 2422 is optionally coupled to a separate earth engaging member 2412 that is different from the first earth engaging member.

In another aspect, the first and second output shafts 2406 and 2421 are rotatable around a common axis of rotation 2410 with the drive axles 2407 and 2422. In another aspect, output shaft 2406 and drive axle 2407 may be a single continuous shaft coupled to earth engaging member 2413. Similarly, output shaft 2421 and drive axle 2422 may be a single continuous shaft coupled to earth engaging member 2412.

In another aspect, the first transmission 2403 and drive modules 2405 may be mounted downstream of the first motor 2402. Power optionally flows from the first motor 2402 downstream to the first transmission 2403 where it may then transfer through the drive modules 2405 and to the first drive axle 2407 via the first output shaft 2406.

In another aspect, the second transmission 2418 and drive modules 2419 may be mounted downstream of the second motor 2417. Power optionally flows from the second motor 2417 downstream to the second transmission 2418 where it may then transfer through the drive modules 2419 and to the second drive axle 2422 via the second output shaft 2421.

Figure 25:
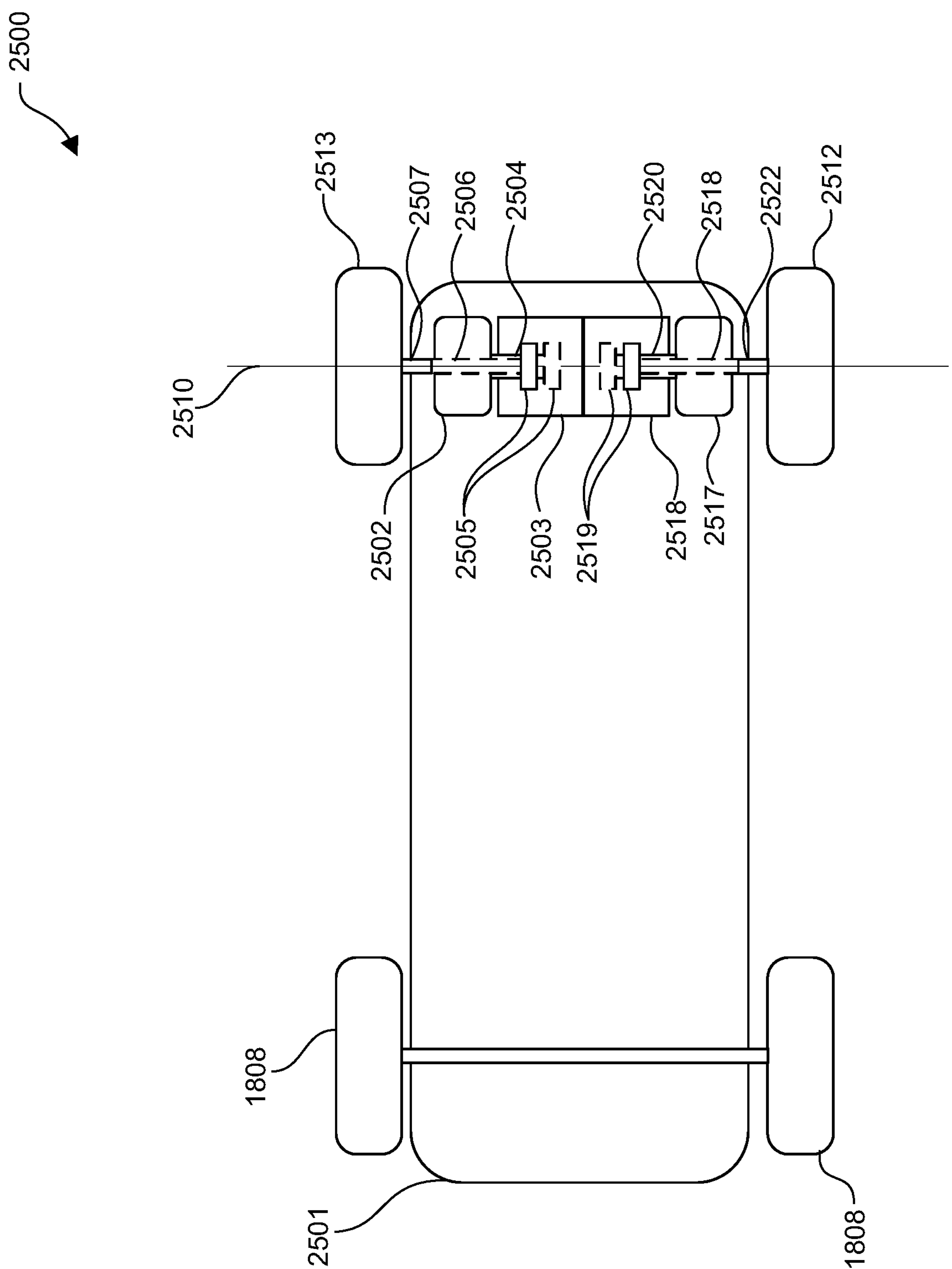
FIG. 25 is a diagram illustrating another example of the components and configuration of a drive system of the present disclosure.

FIG. 25 illustrates at 2500, another example of a vehicle 2501 that is like other vehicles of the preceding figures, but with another different drive train arrangement. Vehicle 2501 optionally includes a first electric motor 2502, and a second electric motor 2517 arranged and configured to provide torque separately to a first transmission 2503 and a second transmission 2518 via a first input shaft 2504 and a second input shaft 2520. The first electric motor 2502 is optionally coupled to the first transmission 2503 by an input shaft 2504, and the second electric motor 2517 is optionally coupled to the second transmission 2518 by an input shaft 2520. In this example, the first and/or the second transmissions 2503 and 2518 optionally include one or more individual drive modules 2505 and 2519 of the present disclosure. Any suitable arrangement of the disclosed drive modules may be included to provide a desirable number of gears and gear ratios according to the present disclosure.

A first output shaft 2506 may be coupled to drive axle 2507. The drive axle 2507 is optionally coupled to a first earth engaging member 2513. A second output shaft 2521 of the second transmission 2518 is optionally coupled to a second drive axle 2522. The second drive axle 2522 is optionally coupled to a separate earth engaging member 2512 that is different from the first earth engaging member.

In another aspect, the first and second output shafts 2506 and 2521 are optionally rotatable around a common axis of rotation 2510 with the drive axles 2507 and 2522. In another aspect, output shaft 2506 and drive axle 2507 may be a single continuous shaft coupled to earth engaging member 2513. Similarly, output shaft 2521 and drive axle 2522 may be a single continuous shaft coupled to earth engaging member 2512.

In another aspect, the first transmission 2503 and drive modules 2505 may be mounted upstream of the first motor 2502. Power optionally flows from the first motor 2502 upstream to the first transmission 2503 where it may then transfer through the gearset 2505 to the output shaft 2506. Output shaft 2506 may then pass back through the first motor 2502 to engage the first drive axle 2507. The output shaft 2506 may optionally pass through at least a portion of the input shaft 2504 to engage the gearset 2505 with the drive axle 2507.

In another aspect, the second transmission 2518 and drive modules 2519 may be mounted upstream of the second motor 2517. Power optionally flows from the second motor 2517 upstream to the second transmission 2518 where it may then transfer through the drive modules 2519 to the output shaft 2521. Output shaft 2521 may then pass back through the second motor 2517 to engage the second drive axle 2522 The output shaft 2521 may optionally pass through at least a portion of the input shaft 2520 to engage the gearset 2519 with the drive axle 2522.

Figure 26:
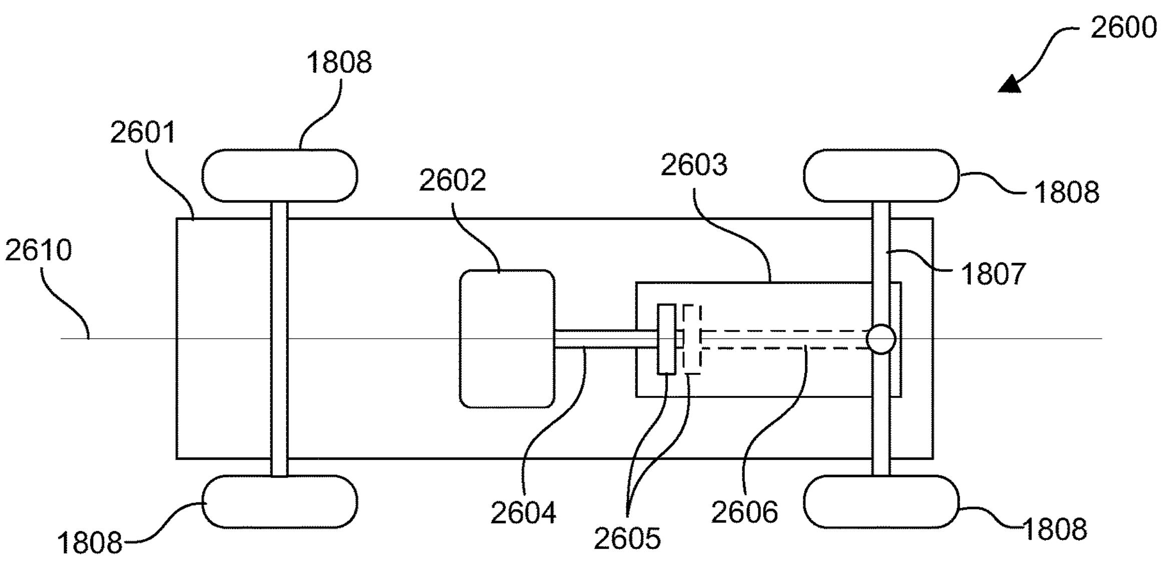
FIG. 26 is a diagram illustrating another example of the components and configuration of a drive system of the present disclosure.

FIG. 26 illustrates at 2600, another example of a vehicle 2601 that is like the vehicles of the preceding figures but with a different drive train arrangement. Vehicle 2601 optionally includes an electric motor 2602 which may be arranged and configured to provide torque for a transmission 2603 via an input shaft 2604. The modular transmission may include an arrangement of one or more drive modules 2605. The drive modules 2605 includes any modules of the present disclosure, and any number thereof, suitable to provide the desired forward and reverse gear ratios. An output shaft 2606 of the transmission may be coupled to the drive modules 2605 according to the present disclosure to optionally provide power to a drive axle 1807. One or more earth engaging members 1808 may be included and may be coupled to the output shaft 2606.

In another aspect, the drive system may be arranged and configured so that motor 2602, transmission 2603, and output shaft 2606 are aligned axially on a common axis 2610. This common axis 2610 may optionally be perpendicular to the drive axle 1807. In another aspect, the input shaft receiving power from the electric motor 2602 may extend toward the motor 2602 in the same direction as the output shaft 2606. The output shaft 2606 may extend away from the drive modules 2605 and toward the drive axle.

In another aspect, the transmission 2603, motor 2602 and gear sets 2605 are positioned within a common housing that partially, or fully, encloses these elements. The drive axle 1807 may be arranged substantially perpendicular to the output shaft 2606, and may optionally be contained at least partially within the common housing of transmission 2603.

In another aspect, the drive modules 2605 may be mounted downstream of the motor 2602 as illustrated in FIG. 26, or upstream of the motor 2602 as illustrated in some of the preceding figures. Power optionally flows from the motor 1902 downstream (or upstream) via the input shaft and into the transmission 2603 where it may then transfer through the drive modules 2605 and to the output shaft 2606. Power may then flow downstream through the output shaft 2606 to drive axle 1807. The output shaft 2606 engages the drive axle 1807 to rotate earth engaging elements 1808.

Figure 27:
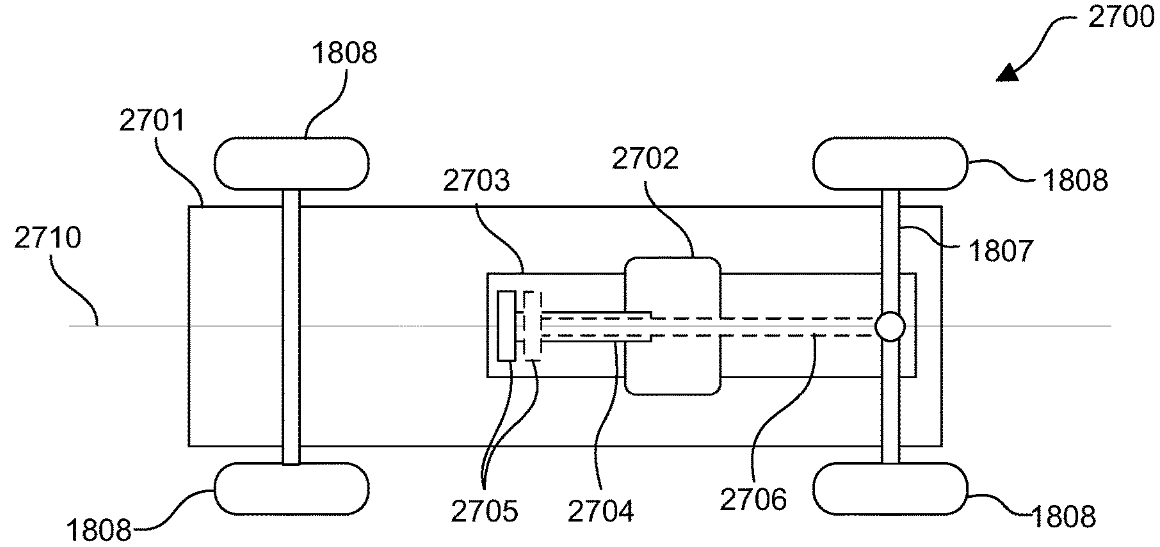
FIG. 27 is a diagram illustrating another example of the components and configuration of a drive system of the present disclosure.

FIG. 27 illustrates at 2700, another example of a vehicle 2701 that is like the vehicles of the preceding figures but with a different drive train arrangement. Vehicle 2701 optionally includes an electric motor 2702 which may be arranged and configured to provide torque to a transmission 2703 via an input shaft 2704. The modular transmission may include an arrangement of one or more planetary drive modules 2705. The drive modules 2705 optionally include any modules of present disclosure and may be configured accordingly to provide any suitable forward and reverse gear ratios as disclosed herein. An output shaft 2706 of the transmission may be coupled to the drive modules 2705 according to the present disclosure to optionally provide power to a drive axle 1807. One or more earth engaging members 1808 may be included and may be coupled to the output shaft 2706.

In another aspect, the drive system may be arranged and configured so that the motor 2702, the transmission 2703, and the output shaft 2706 are aligned axially on a common axis 2710. This common axis 2710 may optionally be substantially perpendicular to the drive axle 1807. In another aspect, the input shaft 2704 receiving power from the electric motor 2702 may extend outwardly toward the motor 2702 in the opposite direction as the output shaft 2706 which may extend outwardly away from the transmission and toward the drive axle. In another aspect, the output shaft 2706 optionally passes through an opening defined by the input shaft 2704 and through an opening defined by the electric motor 2702 to engage with the drive axle 1807. In another aspect, the drive axle 1807 optionally passes through a housing of the transmission 2703, and the output shaft 2706 is optionally contained within the housing of the transmission 2703.

In another aspect, the drive modules 2705 may be mounted upstream of the motor 2702 in the transmission 2703. Power optionally flows from the motor 2702 upstream through the input shaft 2704 and into the drive modules 2705 of the present disclosure where it may then transfer through the drive modules and to the output shaft 2706. Power may then flow downstream through the output shaft 2706 back through the motor 2702, and to the drive axle 1807. The output shaft 2706 thus extends from the transmission 2703 to engage the drive axle 1807, and passes through a central cavity defined by the motor 2702.

The concepts illustrated and disclosed herein related to a modular transmission and drive system may be arranged and configured according to any of the following non-limiting numbered examples:

Example 1: A transmission, comprising multiple individual drive modules configured to shift between one or more gears.

Example 2: The transmission of any other example, wherein the drive modules include a housing separate and distinct from the housing of other drive modules.

Example 3: The transmission of any other example, wherein the housing of the drive modules defines at least one mount point arranged and configured to interconnect together with mount points of others of the multiple individual drive modules.

Example 4: The transmission of any other example, wherein the drive modules include a planetary gearset mounted within the housing and having a sun gear, a carrier with planetary gears, and a ring gear.

Example 5: The transmission of any other example, wherein the sun gear is coupled to an input shaft, and the carrier is coupled to an output shaft.

Example 6: The transmission of any other example, a shifting assembly operable to selectively couple the ring gear either to the carrier, the sun gear, or to ground, to achieve multiple different gear ratios of the input shaft to the output shaft.

Example 7: The transmission of any other example, wherein the output shaft of an upstream drive module is arranged and configured to couple to the input shaft of a downstream drive module.

Example 8: The transmission of any other example, wherein the overall number of gear ratios obtainable by the transmission is M raised to the Nth power, where M is the number of gear ratios provided by each module in the transmission, and N is the number of multiple individual drive modules included in the transmission.

Example 9: The transmission of any other example, wherein the shifting assembly of any of the multiple individual drive modules is operable to selectively couple the ring gear of the planetary gearset to ground to achieve a first gear ratio.

Example 10: The transmission of any other example, wherein the shifting assembly of any of the multiple individual drive modules is operable to selectively couple the carrier to ground to achieve a second gear ratio.

Example 11: The transmission of any other example, wherein the shifting assembly comprises a synchronizer that is operable in a first mode to achieve the first gear, and in a second separate mode to achieve the second gear.

Example 12: The transmission of any other example, wherein the shifting assembly of any of the multiple individual drive modules is operable to selectively couple the ring gear to ground to achieve a first gear ratio.

Example 13: The transmission of any other example, wherein the shifting assembly of any of the multiple individual drive modules is operable to selectively couple the ring gear to the sun gear and the input shaft to achieve a second gear ratio Example 14: The transmission of any other example, wherein the shifting assembly comprises a first clutch operable to couple the ring gear to ground to achieve the first gear.

Example 15: The transmission of any other example, wherein the shifting assembly comprises a second clutch operable to couple the ring gear to the sun gear and the input shaft to achieve the second gear ratio.

Example 16: The transmission of any other example, wherein the shifting assembly of any of the multiple individual drive modules is operable to selectively couple the ring gear to ground to achieve a first gear ratio.

Example 17: The transmission of any other example, wherein the shifting assembly of any of the multiple individual drive modules is operable to selectively couple the the carrier to the sun gear and the input shaft to achieve a second gear ratio that is higher than the first gear ratio.

Example 18: The transmission of any other example, wherein the shifting assembly comprises a first clutch operable to couple the ring gear to ground to achieve the first gear.

Example 19: The transmission of any other example, wherein the shifting assembly comprises a second clutch operable to couple the carrier to the sun gear and the input shaft to achieve the second gear ratio.

Example 20: The transmission of any other example, wherein the shifting assembly of any of the multiple individual drive modules is operable to selectively couple the ring gear of the planetary gearset to ground to achieve a first gear ratio.

Example 21: The transmission of any other example, wherein the shifting assembly of any of the multiple individual drive modules is operable to selectively couple the carrier to the ring gear to achieve a second gear ratio that is higher than the first gear ratio.

Example 22: The transmission of any other example, wherein the shifting assembly comprises a first clutch is operable to couple the ring gear to ground to achieve the first gear.

Example 23: The transmission of any other example, wherein the shifting assembly comprises a second clutch operable to couple the ring gear to the carrier to achieve the second gear ratio.

Example 24: The transmission of any other example, wherein the housing of each module at least partially surrounds the planetary gearset, and wherein the housing operates as a ground for the gearset.

Example 25: The transmission of any other example, wherein a rotational direction of the input shaft of each of the multiple individual drive modules is directly linked to a rotational direction of the output shaft.

Example 26: The transmission of any other example, wherein a first and second module of the multiple individual drive modules each include a separate shifting assembly that is operable to selectively couple the ring gear of the planetary gearset either to ground to achieve a first gear ratio, or to the carrier to achieve a second gear ratio that is higher than the first gear ratio.

Example 27: The transmission of any other example, wherein a third module of the multiple individual drive module includes a separate shifting assembly that is operable to selectively couple the ring gear of the planetary gearset either to ground to achieve a first gear ratio, or to the sun gear and the input shaft to achieve a second gear ratio that is higher than the first gear ratio.

Example 28: The transmission of any other example, wherein the input shaft of the first module is coupled to the input shaft of the transmission, and wherein the output shaft of the third module is coupled to the output shaft of the transmission.

Example 29: The transmission of any other example, wherein the transmission is configured to shift between the first and second gear ratios of the first, second, and third modules to provide a total of eight separate gear ratios.

Example 30: The transmission of any other example, wherein an input shaft of a first module of the multiple individual drive modules is coupled to an electric motor arranged and is arranged and configured to receive torque from the electric motor, and wherein the output shaft of a second module of the multiple individual drive modules is coupled to a drive axle.

Example 31: A drive system including a modular transmission that includes multiple individual drive modules mounted in the transmission.

Example 32: The drive system of any other example, wherein the individual drive modules include a planetary gearset having a sun gear, a carrier with planetary gears, and a ring gear.

Example 33: The drive system of any other example, wherein the sun gear is coupled to an input shaft, and the carrier is coupled to an output shaft.

Example 34: The drive system of any other example, wherein the individual drive modules include a shifting assembly operable to selectively couple the ring gear either to the carrier or the sun gear, or to ground, to achieve multiple different gear ratios of the input shaft to the output shaft.

Example 35: The drive system of any other example, wherein the output shaft of an upstream drive module of the multiple individual drive modules is arranged and configured to couple to the input shaft of a downstream drive module of the multiple individual drive modules.

Example 36: The drive system of any other example, wherein the overall number of gear ratios obtainable by the transmission is M raised to the Nth power, where M is the number of gear ratios of each independent module, and N is the number of multiple individual drive modules included in the transmission.

Example 37: The drive system of any other example, including an electric motor arranged and configured to transmit torque to the transmission via an input shaft that is coupled to an input shaft of a first drive module of the multiple individual drive modules.

Example 38: The drive system of any other example, including an electric motor mounted either inside or outside of the transmission housing downstream from the individual drive modules.

Example 39: The drive system of any other example, including an electric motor mounted either upstream or downstream of at least one of the individual drive modules.

Example 40: The drive system of any other example, wherein a carrier of a last drive module of the multiple individual drive modules is coupled to an output shaft of the transmission, and wherein the output shaft of the transmission is coupled to a drive axle.

Example 41: The drive system of any other example, wherein the motor, the transmission, and the output shaft are aligned axially perpendicular to the drive axle.

Example 42: The drive system of any other example, wherein the multiple individual drive modules are mounted such that the output shafts share a common axis of rotation.

Example 43: The drive system of any other example, wherein at least one of the multiple individual drive modules is mounted on a common axis downstream of the motor.

Example 44: The drive system of any other example, wherein at least one of the multiple individual drive modules is mounted on a common axis upstream of the motor.

Example 45 The drive system of any other example, wherein the output shaft passes through the input shaft and the electric motor to engage with the drive axle.

Example 46: The drive system of any other example, wherein the output shaft extends from the transmission to engage the drive axle.

Example 47: The drive system of any other example, wherein the drive axle passes through a housing of the transmission and the output shaft is contained within the housing of the transmission.

Example 48: The drive system of any other example, wherein the transmission is mounted downstream of the motor.

Example 49: The drive system of any other example, wherein the transmission is mounted upstream of the motor.

Example 50: The drive system of any other example, wherein the motor and transmission are mounted axially on a common axis that is parallel to the drive axle. Example 51: The drive system of any other example, comprising:

at least two earth engaging members mounted to the drive axle, wherein the motor and transmission are mounted between the at least two earth engaging members.

Example 52: The drive system of any other example, wherein the output shaft of the transmission passes through the input shaft and the electric motor to engage with the drive axle.

Example 53: The drive system of any other example, wherein the output shaft of the transmission and the input shaft of the motor are aligned on a common axis of rotation with the drive axle.

GLOSSARY OF DEFINITIONS AND ALTERNATIVES

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms “a”, “an”, “the”, and the like include plural referents unless expressly discussed otherwise. As an illustration, references to “a device” or “the device” include one or more of such devices and equivalents thereof.

Directional terms, such as “up”, “down”, “top” “bottom”, “fore”, “aft”, “lateral”, “longitudinal”, “radial”, “circumferential”, etc., are used herein solely for the convenience of the reader in order to aid in the reader’s understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple “laterally extending elements” 90A, 90B, 90C, and 90D are illustrated in the drawings, the disclosure may refer to these as “laterally extending elements 90A-90D,” or as “laterally extending elements 90,” or by a distinguishable portion of the full name such as “elements 90”.

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster’s and Random House dictionaries. As used herein, the following definitions apply to the following terms or to common variations thereof (e.g., singular/plural forms, past/present tenses, etc.):

“About” with reference to numerical values generally refers to plus or minus 10% of the stated value. For example, if the stated value is 4.375, then use of the term "about 4.375" generally means a range between 3.775 and 4.8125.

"Activate" generally is synonymous with "providing power to", or refers to "enabling a specific function" of a circuit or electronic device that already has power.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

A brake is optionally implemented with one or more frictional elements selectively pressed into contact with one another. A brake may include a friction braking system with one or more rotatable braking components interspersed between one or more stationary braking components. The stationary braking components may, for example, be rigidly coupled to a housing or other structure that may be included in a drive system. By selectively applying a compression force to the rotating and stationary components, the rotating components may be pressed against the stationary components until the rotation is brought to a complete stop thus "grounding" the rotating portion of the braking assembly to the stationary components while the compression force is maintained.

In another aspect, a brake may include one or more dog clutches having rotating components that engage by interference or clearance fit thus reducing or eliminating the opportunity for slip that may be inherent in a friction brake. A dog clutch configuration may be useable either in place of the frictional components or along with them. In another aspect, a brake may include a Selectable One Way Clutch (SOWC).

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, rim clutches, and Selectable One Way Clutch (SOWC) to name just a few examples.

A clutch is optionally implemented with one or more frictional elements selectively pressed into contact with one another. These frictional elements may be rotatable and are optionally interspersed between each other. One or more frictional elements may be coupled to the input side of the clutch where power is received, while one or more other frictional elements may be coupled to the output side of the clutch from which downstream components may receive torque. By selectively applying a compression force to the multiple sets of frictional components, the input side and the output side may be held stationary with respect to each other while the compression force is maintained. This allows torque applied to the input side (such as from the motor or other prime mover) to be selectively transmitted to the output side when the clutch is engaged or activated.

In another aspect, clutches of the present disclosure may include one or more dog clutches having rotating components that engage by interference or clearance fit thus reducing or eliminating the opportunity for slip that may be inherent in a friction clutch. A dog clutch configuration may be useable either in place of frictional components, or along with them.

"Contact" generally refers to a condition and/or state where at least two objects are physically touching. For example, contact requires at least one location where objects are directly or indirectly touching, with or without any other member(s) material in between.

"Controller" or "Control Circuit" generally refers to a mechanical or electronic device configured to control the behavior of another mechanical or electronic device. A controller or a control circuit may be configured to provide signals or other electrical impulses that may be received and interpreted by the controlled device to indicate how it should behave. Controllers or control circuits may control other controllers or control circuits such as in a master-slave configuration where the master is configured to control a slave based on input from the master.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Downstream" generally refers to a direction or relative location that is the same as where power flows in a system.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"Ground" or "Mechanical Ground" generally refers to a physical structure useful for holding one or more mechanical objects stationary relative to that physical structure. When used as a verb, "grounding" a mechanical object in motion generally refers to slowing the mechanical motion to a halt relative to the grounding structure and maintaining it in place.

"Interchangeable" generally refers to two or more things that are capable of being put and/or used in place of each other. In other words, one thing is capable of replacing and/or changing places with something else. For example, interchangeable parts typically, but not always, are manufactured to have nearly the same structural size as well as shape within normal manufacturing tolerances and have nearly the same operational characteristics so that one part can be replaced by another interchangeable part. In some cases, the interchangeable parts can be manufactured and/or sold by a specific company under the same part or Stock Keeping Unit (SKU) identifier, and in other cases, different companies can manufacture and/or sell the same interchangeable parts.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Lateral" generally refers to being situated on, directed toward, or coming from the side.

"Longitudinal" generally relates to length or lengthwise dimension of an object, rather than across.

"Means For" in a claim invokes 35 U.S.C. 112(f), literally encompassing the recited function and corresponding structure and equivalents thereto. Its absence does not, unless there otherwise is insufficient structure recited for that claim element. Nothing herein or elsewhere restricts the doctrine of equivalents available to the patentee.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Multiple" as used herein is synonymous with the term "plurality" and refers to more than one, or by extension, two or more.

"Optionally" means discretionary; not required; possible, but not compulsory; left to personal choice.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Portion" means a part of a whole, either separated from or integrated with it.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Predominately" as used herein is synonymous with greater than 50%.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or free-wheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively, or additionally, the SOWC can be controlled to switch or change the locked and free-wheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and free-wheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refer to a property of something having two sides or halves that are the same relative to one another, such as in shape, size, and/or style. In other words, symmetric describes something as having a mirror-image quality.

"Synchronizer" or "Synchronizer Mechanism" ("Synchromesh") generally refer to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Upstream" generally refers to a direction or relative location that is opposite from where power flows in a system.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

What is claimed is:

1. A transmission, comprising:

multiple individual drive modules, wherein at least two of the drive modules include:

a housing that is separate and distinct from the housings of other drive modules of the multiple individual drive modules, the housing defining at least one mount point arranged and configured to interconnect together with mount points of others of the multiple individual drive modules, wherein the at least one mount point defines a standardized mounting interface arranged and configured to removably and directly interconnect with the standardized mounting interface of another drive module housing, the standardized mounting interface configured to align the at least two drive modules by virtue of projections of one drive module of the at least two drive modules that extend into corresponding indentions of a second drive module of the at least two drive modules, such that either of the at least two drive modules can be added to, removed from, or replaced in the transmission upstream or downstream of one another in any order without modification of the modules or the transmission;

a planetary gearset mounted within the housing and having a sun gear, a carrier with planetary gears, and a ring gear, wherein the sun gear is directly coupled to an input shaft, and the carrier is directly coupled to an output shaft; and a shifting assembly operable to selectively couple the ring gear to the carrier and to ground, or the carrier to the sun gear and to ground, to selectively achieve two different gear ratios of the input shaft to the output shaft;

wherein each of the at least two drive modules is configured to provide the same two different gear ratios;

wherein the output shaft of an upstream drive module is arranged and configured to couple to the input shaft of a downstream drive module;

wherein the multiple individual drive modules are positioned within a transmission housing that at least partially encloses the multiple individual drive modules; and wherein the overall number of gear ratios obtainable by the transmission is 2 raised to the Nth power, where N is the number of multiple individual drive modules included in the transmission.

2. The transmission of claim 1, wherein the shifting assembly of any of the multiple individual drive modules is operable to selectively couple the ring gear of the planetary gearset either to ground to achieve a first gear ratio, or to the carrier to achieve a second gear ratio that is higher than the first gear ratio.

3. The drive system of claim 2, wherein the shifting assembly comprises a synchronizer that is operable in a first mode to achieve the first gear, and in a second separate mode to achieve the second gear.

4. The transmission of claim 2, wherein the shifting assembly comprises a first clutch operable to couple the ring gear to ground to achieve the first gear, and a second clutch operable to couple the ring gear to the carrier to achieve the second gear ratio.

5. The transmission of claim 1, wherein the housing of each module at least partially surrounds the planetary gearset, and wherein the housing operates as a ground for the gearset.

6. The transmission of claim 1, wherein a rotational direction of the input shaft of each of the multiple individual drive modules is directly linked to a rotational direction of the output shaft.

7. The transmission of claim 1, wherein an input shaft of a first module of the multiple individual drive modules is coupled to an electric motor arranged and is arranged and configured to receive torque from the electric motor, and wherein the output shaft of a second module of the multiple individual drive modules is coupled to a drive axle.

8. A drive system comprising:

a transmission that includes:

multiple individual drive modules mounted in the transmission, wherein at least two of the multiple drive modules include:

a planetary gearset having a sun gear, a carrier with planetary gears, and a ring gear, wherein the sun gear is directly coupled to an input shaft, and the carrier is directly coupled to an output shaft; and a shifting assembly operable to selectively couple the ring gear to the carrier and to ground, or the carrier to the sun gear and to ground, to achieve two different gear ratios of the input shaft to the output shaft;

wherein each of the at least two drive modules is configured to provide the same two different gear ratios;

wherein the multiple individual drive modules define at least one mount point arranged and configured to interconnect together with mount points of others of the multiple individual drive modules, wherein the at least one mount point defines a standardized mounting interface arranged and configured to removably and directly interconnect with the standardized mounting interface of another drive module housing, the standardized mounting interface configured to align the at least two drive modules by virtue of projections of one drive module of the at least two drive modules that extend into corresponding indentions of a second drive module of the at least two drive modules, such that either of the at least two drive modules can be added to, removed from, or replaced in the transmission upstream or downstream of one another in any order without modification of the modules or the transmission;

wherein the output shaft of an upstream drive module of the multiple individual drive modules is arranged and configured to couple to the input shaft of a downstream drive module of the multiple individual drive modules;

wherein the multiple individual drive modules are positioned within a transmission housing that at least partially encloses the multiple individual drive modules; and wherein the overall number of gear ratios obtainable by the transmission is two raised to the Nth power, where N is the number of multiple individual drive modules included in the transmission;

an electric motor arranged and configured to transmit torque to the transmission via an input shaft that is coupled to an input shaft of a first drive module of the multiple individual drive modules, and wherein a carrier of a last drive module of the multiple individual drive modules is coupled to an output shaft of the transmission, and wherein the output shaft of the transmission is coupled to a drive axle.

9. The drive system of claim 8, wherein the motor, the transmission, and the output shaft of the transmission are aligned axially perpendicular to the drive axle.

10. The drive system of claim 8, wherein the multiple individual drive modules are mounted such that the output shafts share a common axis of rotation.

11. The drive system of claim 10, wherein at least one of the multiple individual drive modules is mounted on a common axis downstream of the motor.

12. The drive system of claim 10, wherein at least one of the multiple individual drive modules is mounted on a common axis upstream of the motor.

13. The drive system of claim 12, wherein the output shaft of the transmission passes through the input shaft and the electric motor to engage with the drive axle.

14. The drive system of claim 8, wherein the output shaft of the transmission extends from the transmission to engage the drive axle.

15. The drive system of claim 14, wherein the drive axle passes through the transmission housing and the output shaft of the transmission is contained within the transmission housing.

16. The drive system of claim 8, wherein the transmission is mounted downstream of the motor.

17. The drive system of claim 8, wherein the transmission is mounted upstream of the motor.

18. The drive system of claim 8, wherein the motor and transmission are mounted axially on a common axis that is parallel to the drive axle.

19. The drive system of claim 8, comprising:

at least two earth engaging members mounted to the drive axle, wherein the motor and transmission are mounted between the at least two earth engaging members.

20. The drive system of claim 19, wherein the output shaft of the transmission passes through the input shaft of at least the first drive module and the electric motor to engage with the drive axle.

21. The drive system of claim 19, wherein the output shaft of the transmission and the input shaft of the electric motor are aligned on a common axis of rotation with the drive axle.

* * * * *